(12) United States Patent
Griot et al.

(10) Patent No.: US 9,729,351 B2
(45) Date of Patent: Aug. 8, 2017

(54) IDENTIFYING A DOMAIN FOR DELIVERY OF MESSAGE SERVICE INFORMATION

(75) Inventors: Miguel Griot, San Diego, CA (US); Osok Song, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 846 days.

(21) Appl. No.: 12/851,679

(22) Filed: Aug. 6, 2010

(65) Prior Publication Data
US 2011/0188448 A1  Aug. 4, 2011

Related U.S. Application Data

(60) Provisional application No. 61/232,733, filed on Aug. 10, 2009.

(51) Int. Cl.
H04L 12/58 (2006.01)
H04W 4/12 (2009.01)
H04L 29/06 (2006.01)

(52) U.S. Cl.
CPC ............. *H04L 12/58* (2013.01); *H04L 51/00* (2013.01); *H04L 65/1016* (2013.01); *H04W 4/12* (2013.01)

(58) Field of Classification Search
CPC ...................... H04L 29/12311; H04L 61/2084
USPC ............... 370/328, 338, 352; 455/435.1, 466
See application file for complete search history.

(56) References Cited

U.S. PATENT DOCUMENTS

| 5,729,537 A | 3/1998 | Billstroem |
| 6,567,667 B1 | 5/2003 | Gupta et al. |
| 7,349,425 B2 | 3/2008 | Leung et al. |
| 7,693,508 B2 | 4/2010 | Leung et al. |
| 8,521,170 B2 | 8/2013 | Buckley et al. |

(Continued)

FOREIGN PATENT DOCUMENTS

| CN | 101087269 A | 12/2007 |
| CN | 101371532 A | 2/2009 |

(Continued)

OTHER PUBLICATIONS

"3rd Generation Partnership Project; Technical Specification Group Services and System Aspects; Circuit Switched Fallback, in Evolved Packet System; Stage 2 (Release 9)", 3GPP Standard; 3GPP TS 23.272, SRD Generation Partnersip project (3GPP), Mobile Competence Centre ; 650, Route Des Lucioles ; F-06921 Sophia-Antipolis Cedec ; France , No. V9.0.0, Jun. 1, 2009 (Jun. 1, 2009), pp. 1-50, XP050363522.

(Continued)

*Primary Examiner* — Yemane Mesfin
*Assistant Examiner* — Peter Chen
(74) *Attorney, Agent, or Firm* — Charles Chesney

(57) ABSTRACT

An indication is used to control how message service information is routed over different domains. For example, an access terminal may be configured with an indication that indicates that a message service is preferred to be invoked over an IP domain or that the message service is not be invoked over the IP domain. The access terminal then delivers message service information based on the value of the indication. In some cases, a network entity generates the indication and sends the indication to the access terminal. In some cases, a domain for delivery of message service information is selected based on a domain that was selected for particular type of traffic.

54 Claims, 17 Drawing Sheets

(56) References Cited

U.S. PATENT DOCUMENTS

| | | |
|---|---|---|
| 2002/0006125 A1 | 1/2002 | Josse et al. |
| 2005/0033852 A1 | 2/2005 | Tenhunen |
| 2006/0258394 A1 | 11/2006 | Dhillon et al. |
| 2007/0026859 A1 | 2/2007 | Hayashi |
| 2007/0032251 A1 | 2/2007 | Shaheen |
| 2007/0183410 A1 | 8/2007 | Song et al. |
| 2007/0213052 A1 | 9/2007 | Lim et al. |
| 2007/0254681 A1 | 11/2007 | Horvath et al. |
| 2008/0043726 A1 | 2/2008 | Herrero-Veron et al. |
| 2008/0080480 A1 | 4/2008 | Buckley et al. |
| 2008/0182615 A1 | 7/2008 | Xue et al. |
| 2008/0254791 A1* | 10/2008 | Oyama et al. ............ 455/435.1 |
| 2008/0275943 A1 | 11/2008 | Grayson et al. |
| 2009/0049202 A1 | 2/2009 | Pattison et al. |
| 2009/0156242 A1* | 6/2009 | Wang .......................... 455/466 |
| 2009/0221310 A1 | 9/2009 | Chen et al. |
| 2010/0205268 A1* | 8/2010 | Zhu et al. ..................... 709/206 |
| 2010/0254313 A1* | 10/2010 | Hallenstal et al. ........... 370/328 |
| 2011/0028120 A1* | 2/2011 | Wu ............................ 455/404.1 |
| 2011/0191430 A1 | 8/2011 | Griot et al. |
| 2011/0264747 A1 | 10/2011 | Mutikainen et al. |

FOREIGN PATENT DOCUMENTS

| | | |
|---|---|---|
| CN | 101438606 A | 5/2009 |
| EP | 2056612 A1 | 5/2009 |
| JP | 2005020198 A | 1/2005 |
| JP | 2007036537 A | 2/2007 |
| JP | 2008042913 A | 2/2008 |
| KR | 20080091192 A | 10/2008 |
| KR | 20090008314 | 1/2009 |
| KR | 20090045345 A | 5/2009 |
| RU | 2006136984 A | 4/2008 |
| WO | WO-9848587 A1 | 10/1998 |
| WO | WO-9916266 A1 | 4/1999 |
| WO | WO0031995 A1 | 6/2000 |
| WO | WO-02080454 A2 | 10/2002 |
| WO | WO-02080589 A2 | 10/2002 |
| WO | WO-2007130761 A2 | 11/2007 |

OTHER PUBLICATIONS

"3rd Generation Partnership Project; Technical Specification Group Services and System Aspects; General Packet Radio Service (GPRS) enhancements f o r Evol ved Universal Terrestrial Radio Access Network (E-UTRAN) access (Re1 ease 9)", 3GPP Standard; 3GPP TS 23.401, 3rd Generation Partnership Project (3GPP), Mobile Competence Centre ; 650, Route Des Lucioles ; F-068921 Sophia-Antipolis Cedex ; France, No. V9.1.0, Jun. 1, 2009 (Jun. 1, 2009), pp. 1-234, XP050363632, abstract sections 5.3.2, 5.3.3.

Alcatel-Lucent: "Coexistence of CSFB with SMSoIP for SMS"3GPP Draft; 52-694854 Was 4476-CR 23221 R9 for SMS Over LTE-V1, 3rd Generation Partnership Project (3GPP), Mobile Competence Centre ; 650, Route Des Lucioles ; F-06921 Sophia-Antipolis Cedes ; France, No. Sophia; Jul. 9, 2009, Jul. 9, 2009 (Jul. 9, 2009), XP050356256, [retrieved on 2009-07-091].

Digital cellular telecommunications system (Phase 2+) ; Uni versal Mobile Telecommunications System (UMTS) ; LTE ; Architectural requirements (3GPP TS 23.221 version 8.4.0 Release 8) Technical Specification, European Telecommunications Standards Institiute (ETSI), 650, Route Des Lucioles ; F-06921 Sophia-Antipolis ; France, No. v8.4.0, Jun. 1, 2009 (Jun. 1, 2009), XP014044527, Section 7.2a.

International Search Report and Written Opinion—PCT/US2010/045095, International Search Authority—European Patent Office—Mar. 11, 2011.

International Search Report and Written Opinion—PCT/US2010/045096—ISA/EPO—Jul. 26, 2011.

Taiwan Search Report—TW099126655—TIPO—Oct. 14, 2013.

3GPP TS 23.272 V8.4.0 (Jun. 2009) 3rd Generation Partnership Project; Technical Specification Group Services System Aspects; Circuit Switched Fallback in Evolved Packet System; Stage 2 (Release 8), 48 pages.

* cited by examiner

IDENTIFYING A DOMAIN FOR DELIVERY OF MESSAGE SERVICE INFORMATION

CLAIM OF PRIORITY

This application claims the benefit of and priority to commonly owned U.S. Provisional Patent Application Ser. No. 61/232,733, filed Aug. 10, 2009, entitled "METHOD AND APPARATUS TO ENABLE SHORT MESSAGING SERVICE (SMS) DOMAIN SELECTION," the disclosure of which is hereby incorporated by reference herein.

CROSS-REFERENCE TO RELATED APPLICATION

This application is related to concurrently filed and commonly owned U.S. patent application Ser. No. 12/851,678, entitled "DOMAIN SELECTION FOR MOBILE-ORIGINATED MESSAGE SERVICE," which further claims the benefit of and priority to commonly owned U.S. Provisional Patent Application Ser. No. 61/232,733, and the disclosure of which is hereby further incorporated by reference herein.

BACKGROUND

Field

This application relates generally to communication and more specifically, but not exclusively, to selection of a domain for delivery of message service information.

Introduction

A wireless communication network may be deployed over a defined geographical area to provide various types of services (e.g., voice, data, multimedia services, etc.) to users within that geographical area. In a typical implementation, access points (e.g., corresponding to different cells) are distributed throughout a network to provide wireless connectivity for access terminals (e.g., cell phones) that are operating within the geographical area served by the network.

Various types of information may be sent between an access terminal and a network and this information may be sent over different types of domains. For example, the access terminal may send voice traffic, web browser traffic, streaming traffic, Short Message Service (SMS) traffic (e.g., for delivery of up to 160, characters), and other types of traffic to the network. In addition, in various scenarios this traffic may be sent via an Internet Protocol (IP) domain or some other type of domain (e.g., a circuit switched (CS) domain). For example, an access terminal for a GSM EDGE Radio Access Network (GERAN) or UMTS Terrestrial Radio Access Network (UTRAN) system may be capable of communicating via an IP domain such as an IP Multimedia Subsystem (IMS) domain or a CS domain. Similarly, an access terminal for an Evolved-UTRAN (E-UTRAN) system may be capable of communicating via an IP domain such as an IMS domain or a CS fallback (CSFB) domain. Consequently, there is a need for effective techniques for facilitating the delivery of information from an access terminal over different types of domains.

SUMMARY

A summary of sample aspects of the disclosure follows. In the discussion herein, any reference to the term aspects may refer to one or more aspects of the disclosure.

The disclosure relates in some aspects to providing an indication that is used for controlling how information for a message service (e.g., a text communication service such as SMS) is routed over different domains. For example, an access terminal may be configured with an indication (e.g., the access terminal receives an indication and maintains that indication) that indicates that a message service is preferred to be invoked over an IP domain, or that the message service is not be invoked over an IP domain. The access terminal then delivers message service information based on the value of the indication. For example, if the indication indicates a preference for delivering SMS over IMS, the access terminal first attempts to use an IMS domain for delivery of SMS. If this attempt fails, the access terminal may then attempt to deliver SMS over a non-access stratum (NAS) domain. In this case, the access terminal may register with a CS domain (e.g., register with a Mobile Switching Center) if the access terminal is not already registered. Conversely, if the indication indicates that IMS is not to be used for delivering SMS, the access terminal may simply attempt to deliver SMS over NAS (including registering with a CS domain, if applicable).

Accordingly, upon determining that message service information is to be sent, an access terminal may identify a domain for delivering the message service information based on an indication maintained at the access terminal. The access terminal then delivers the message service information over the identified domain.

In some cases, a network entity may generate the indication and send the indication to the access terminal. For example, a home operator may define an OMA-DM flag that is sent to the access terminal to specify the home operator's preference or capabilities regarding domain selection.

The disclosure relates in some aspects to selecting a domain based on a domain that was selected for particular type of traffic. For example, upon determining that message service information is to be sent, an access terminal may identify a domain that is used for voice traffic. The access terminal may then attempt to deliver the message service information over this domain.

BRIEF DESCRIPTION OF THE DRAWINGS

These and other sample aspects of the disclosure will be described in the detailed description and the appended claims that follow, and in the accompanying drawings, wherein:

Figure 1:
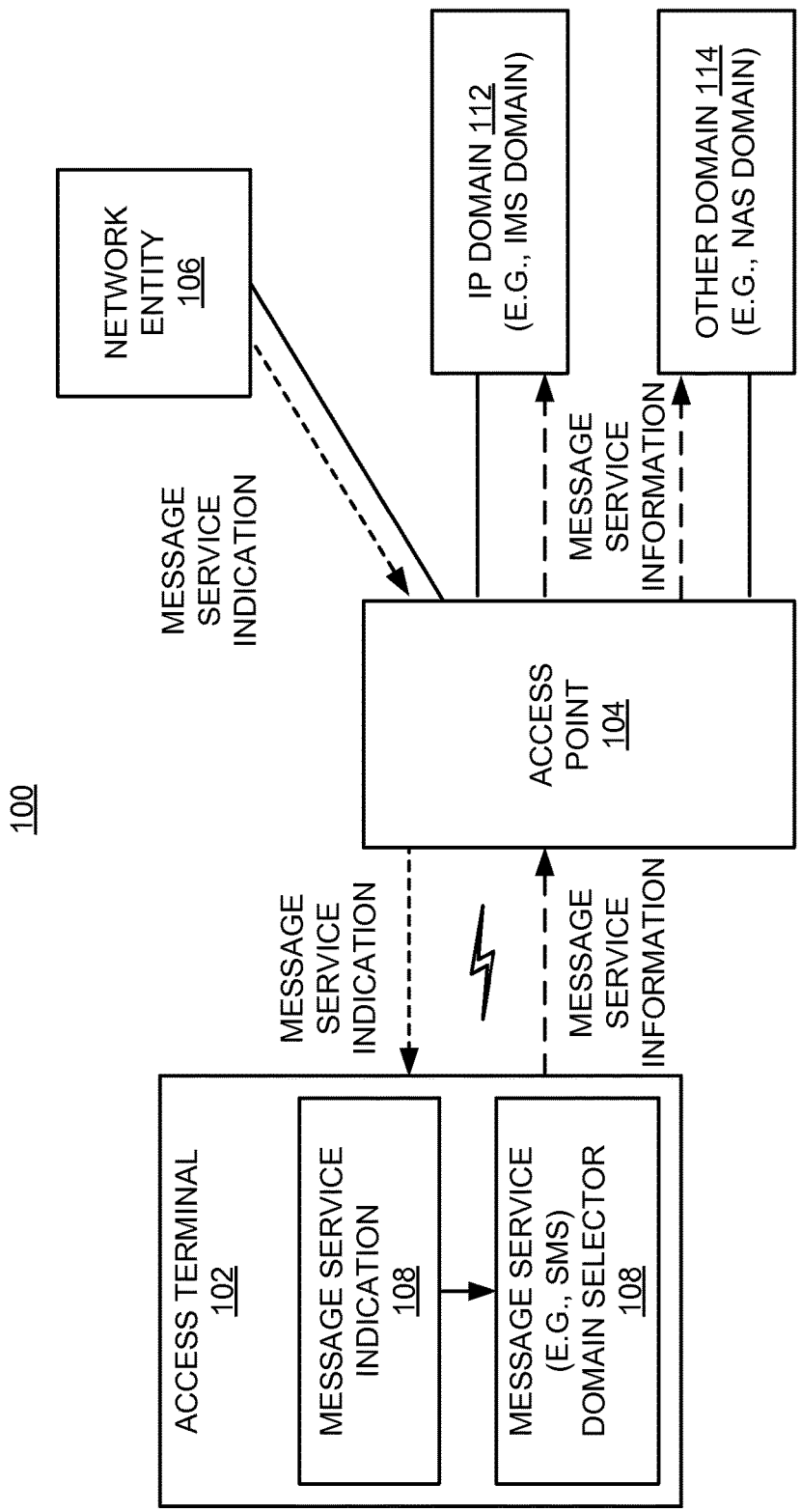
FIG. 1 is a simplified block diagram of several sample aspects of a communication system where a domain for delivery of message service information is selected based on an indication.

In accordance with common practice the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

Various aspects of the disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim.

FIG. 1 illustrates several nodes of a sample communication system 100 (e.g., a portion of a communication network). For illustration purposes, various aspects of the disclosure will be described in the context of one or more access terminals, access points, and network entities that communicate with one another. It should be appreciated, however, that the teachings herein may be applicable to other types of apparatuses or other similar apparatuses that are referenced using other terminology. For example, in various implementations access points may be referred to or implemented as eNodeBs, NodeBs, base stations, and so on, while access terminals may be referred to or implemented as user equipment, mobile stations, mobiles, and so on.

Access points in the system 100 provide one or more services (e.g., network connectivity) for one or more wireless terminals (e.g., access terminal 102) that may be installed within or that may roam throughout a coverage area of the system 100. For example, at various points in time the access terminal 102 may connect to an access point 104 or some other access point in the system 100 (not shown). Each of these access points may communicate with one or more network entities (represented, for convenience, by network entity 106) to facilitate wide area network connectivity. These network entities may take various forms such as, for example, one or more radio and/or core network entities. Thus, in various implementations the network entity 106 may represent functionality such as at least one of: network management (e.g., via an operation, administration, management, and provisioning entity), call control, session management, mobility management, gateway functions, interworking functions, or some other suitable network functionality.

In accordance with the teachings herein, the access terminal 102 is configured with a message service indication 108 that the access terminal 102 uses to identify a domain for delivering message service information (e.g., an SMS message). For example, based on the value of this indication, a message service domain selector 108 may elect to deliver message service information to an IP domain 112 or to another domain 114. In some implementations, the network entity 106 may configure the access terminal 102 with the message service indication 108 (as represented by the corresponding dashed lines). For example, an entity associated with a home public land mobile network (HPLMN) operator of the access terminal 102 may configure the access terminal 102 with this indication to control the preferred behavior of the access terminal 102.

3GPP specifications provide two mechanisms for SMS delivery: SMS over IMS (an IP domain) and SMS over NAS (e.g., a CS domain). In SMS over IMS, the SMS is delivered in a packet switched (PS) domain user plane using IMS.

In SMS over NAS, the SMS is delivered via NAS signaling. This signaling may take various forms depending on the radio access technology (RAT) upon which the access terminal is currently camping. For an access terminal on GERAN, NAS signaling involves SMS over CS NAS signaling. For an access terminal on UTRAN, NAS signaling involves SMS over General Packet Radio Service (GPRS) NAS signaling and the Gs interface between the Mobile Switching Center (MSC) and the Serving GPRS Support Node (SGSN). For an access terminal on E-UTRAN, NAS signaling involves SMS over EPS NAS signaling and the SGs interface between the MSC and the Mobility Management Entity (MME).

For a CSFB and IMS capable access terminal that is camping on E-UTRAN, or for a CS and IMS capable access terminal that is camping on GERAN/UTRAN, the access terminal may employ the teachings herein to decide how to deliver SMS. In addition, similar techniques may be employed for delivering SMS over other domains. For example, for an access terminal with E-UTRAN and cdma2000, radio technology, when the access terminal is in E-UTRAN, the access terminal may use SMS over IMS or SMS over S102.

The disclosure thus relates in some aspects to a methodology of SMS domain selection for CS/CSFB and IMS capable access terminals across radio access technologies. In some implementations, the access terminal uses one configuration: the access terminal is either configured to use SMS over IMS or the access terminal is not configured to use SMS over IMS (e.g., configured to use SMS over NAS or S102). When the access terminal is configured to use SMS over IMS, the access terminal attempts to deliver SMS over IMS first. If this is not possible, the access terminal tries to deliver SMS over NAS (or S102). When the access terminal is not configured to use SMS over IMS, then the access terminal only attempts SMS over NAS (or S102).

Sample operations that may be performed by a system such as the system 100 in accordance with the teachings herein will be described in more detail in conjunction with the flowcharts of FIGS. 2 and 3. For convenience, the operations of FIGS. 2 and 3 (or any other operations discussed or taught herein) may be described as being performed by specific components (e.g., components as described in FIGS. 1 and 10-14). It should be appreciated, however, that these operations may be performed by other types of components and may be performed using a different number of components. It also should be appreciated that one or more of the operations described herein may not be employed in a given implementation.

Figure 2:
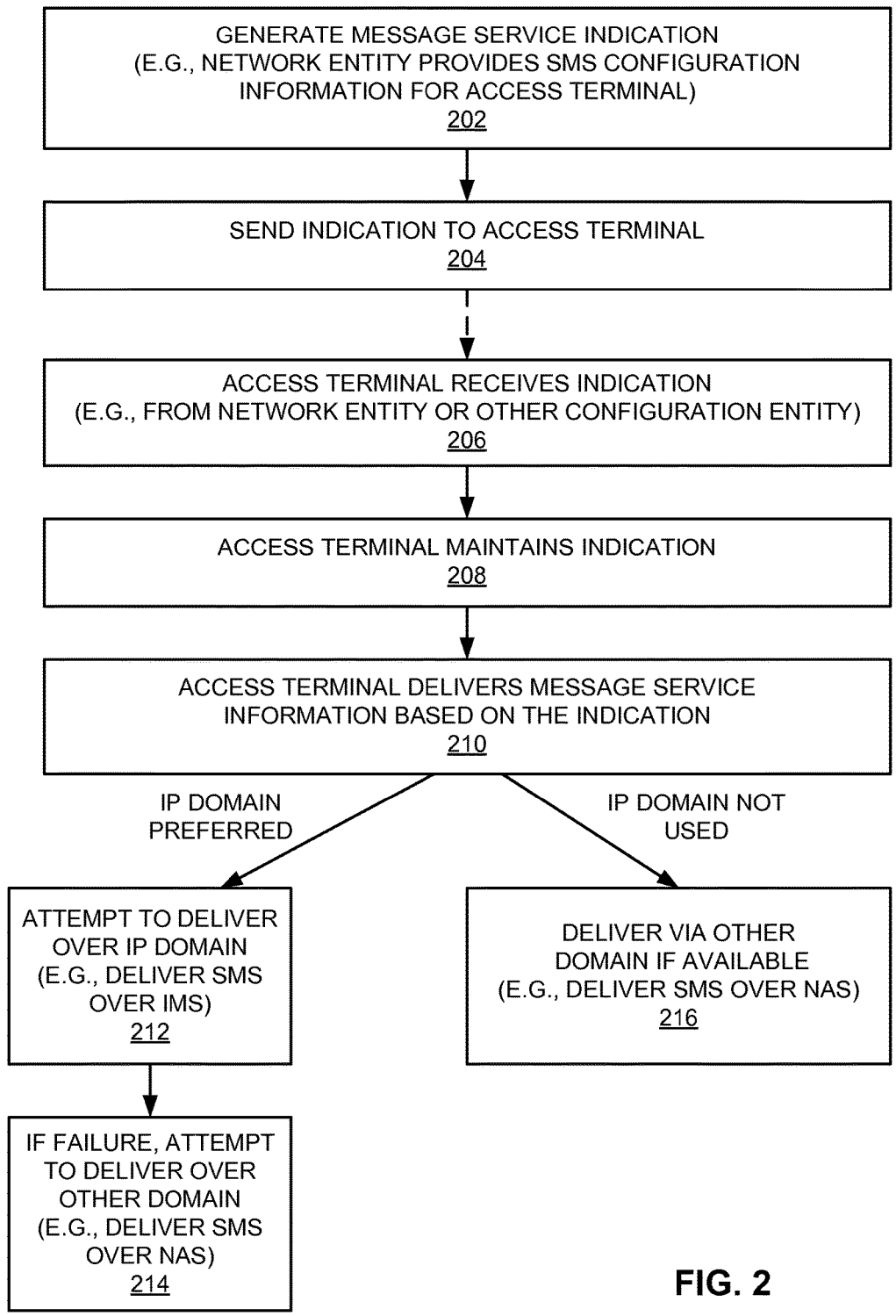
FIG. 2 is a flowchart of several sample aspects of operations that may be performed in conjunction with selecting a domain for delivering message service information based on an indication.

Referring initially to FIG. 2, blocks 202 and 204 describe operations that may be performed to configure an access terminal with a message service indication. Here, at some point in time, a message service indication is generated and then sent to an access terminal.

This indication may take various forms. For example, the indication may indicate (e.g., via a first designated value such as "0") that a message service is preferred to be invoked over an IP domain, or the indication may indicate (e.g., via a second designated value such as "1") that the message service is not be invoked over an IP domain. As a specific example, an "SMS over IMS" indication may indicate that SMS is preferred to be invoked over IMS, or that SMS is not to be invoked over IMS (e.g., SMS is instead to be invoked over NAS or some other domain). Thus, in some aspects, such an indication may indicate whether a given domain is supported by the network (e.g., by a home network).

The operations of blocks 202 and 204 may be performed by various entities such as, for example, a network entity or a configuration entity. As an example of the former, a home operator may generate a flag defined in IMS OMA-DM (open mobile alliance device management) MO (mobile-originated) that indicates whether the home operator for an access terminal wishes to use SMS over IMS. The home operator may then pre-configure and/or dynamically update/configure the access terminal by sending the indication to the access terminal via a network connection. As an example of the latter, a configuration entity may configure (e.g., pre-configure) the access terminal (e.g., by downloading the indication into the access terminal) when the access terminal is initially programmed, when the access terminal is initially deployed, or at some other time.

As represented at block 206, the access terminal will thus receive the message service indication at some point in time (e.g., during a pre-configuration operation or during an update/configuration operation). The access terminal may receive this indication via a wireless connection (e.g., from a network entity via an access point) or via a wired connection (e.g., during a pre-configuration when the access terminal is manufactured).

As represented at block 208, upon receipt of this indication, the access terminal maintains the indication (e.g., stores it in a memory device) for subsequent use during message service operations. Here, an indication received by the access terminal (e.g., during a dynamic update) may override any static configuration the access terminal may maintain regarding SMS.

As represented at block 210, the access terminal delivers message service information based on (e.g., based on the value of) the maintained indication. For example, as represented at block 212, if the indication indicates that an IP domain (e.g., IMS) is preferred, the access terminal attempts to deliver the message service information over the IP domain. As represented at block 214, if this attempt fails, the access terminal may attempt to deliver the message service information over another domain (e.g., NAS). In this case, the access terminal may register with a CS domain (e.g., register with an MSC) if the access terminal is not already registered with the CS domain. For example, in E-UTRAN, the access terminal may perform a combined tracking area update with IMSI attach. Conversely, as represented at block 216, if the indication indicates that an IP domain is not to be used, the access terminal attempts to deliver the message service information over another domain (e.g., NAS). If needed, the access terminal registers with that domain.

Figure 3:
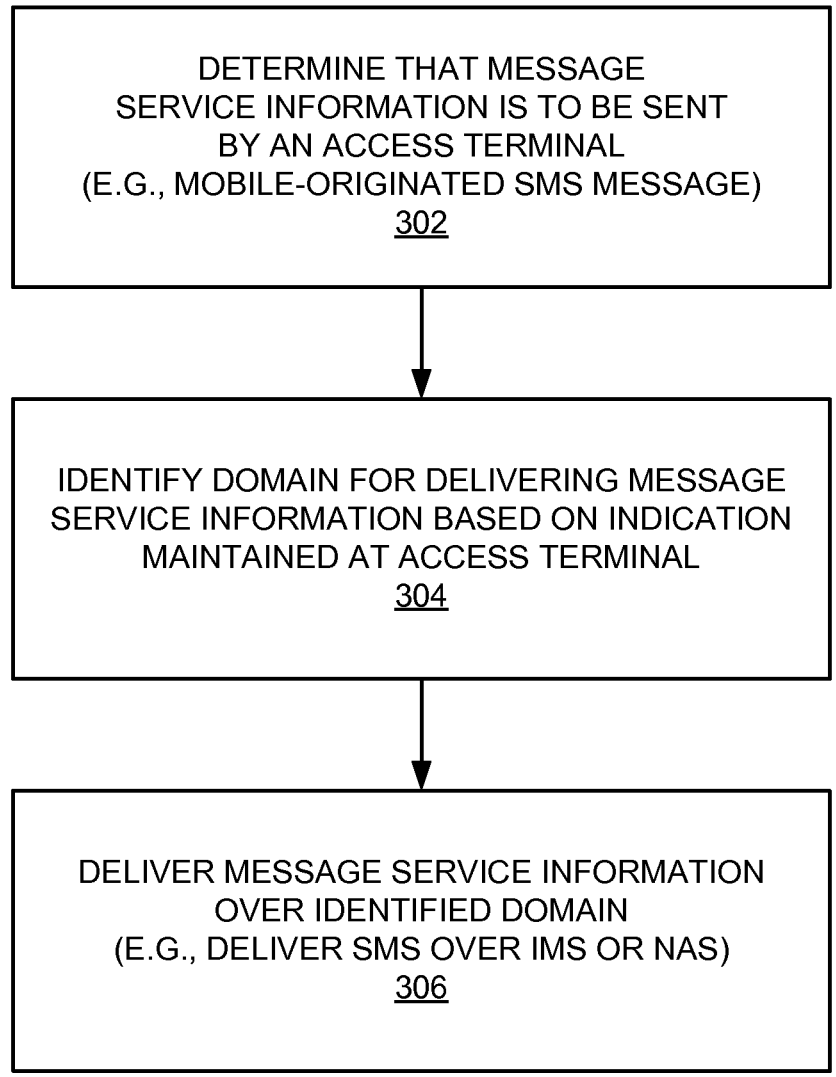
FIG. 3 is a flowchart of several sample aspects of operations that may be performed in conjunction with delivering message service information over an identified domain.

FIG. 3 describes several operations that may be performed by an access terminal to deliver message service information over a selected domain. As represented by block 302, at some point in time the access terminal determines that it needs to send message service information. For example, an application running on the access terminal may need to send a mobile-originated SMS message to another entity via a network.

As represented by block 304, the access terminal identifies a domain for delivering the message service information based on the indication maintained at the access terminal. For example, as discussed above, the access terminal may determine that SMS is to be delivered over IMS or over NAS. As represented by block 306, the access terminal then sends the message service information over the identified domain.

In some aspects, the selection of a domain at an access terminal may depend on other domain selection operations performed by the access terminal. For example, for voice capable access terminals, voice domain selection may be performed by the access terminal to determine the voice service domain between voice over IMS (VoIMS) and CS.

In some implementations, if voice domain selection is to be performed by an access terminal, it may be preferable to have this selection be performed independently of the access terminal's SMS configuration and to give the voice domain selection precedence over the SMS method of delivery selection. In such a case, SMS domain selection will not change the radio access technology selected as the result of the voice domain selection process. Thus, in the event voice domain selection has already been performed at such an access terminal, the scenarios discussed below may exist for SMS domain selection.

Regarding the IMS registration status, the access terminal may either be registered to IMS or not registered to IMS.

Regarding the current radio access technology, the access terminal may be camping on E-UTRAN (the access terminal is already Evolved Packet System (EPS) attached) or the access terminal may be camping on 2G/3G (e.g., GERAN or UTRAN).

For the case where the access terminal is camping on E-UTRAN, the International Mobile Subscriber Identity (IMSI) attach status (non-EPS service) for the access terminal may be one of the following: 1) the access terminal has attempted IMSI attach and failed (in this case, CSFB is not allowed); 2) the access terminal has not yet attempted IMSI attach (e.g., if "PS IMS Voice only" is selected); 3) the access terminal is IMSI attached. With this in mind, FIGS. 4 and 5 describe sample SMS domain selection operations that may be performed by an access terminal camping on E-UTRAN or 2G/3G radio access technology, respectively.

Figure 4:
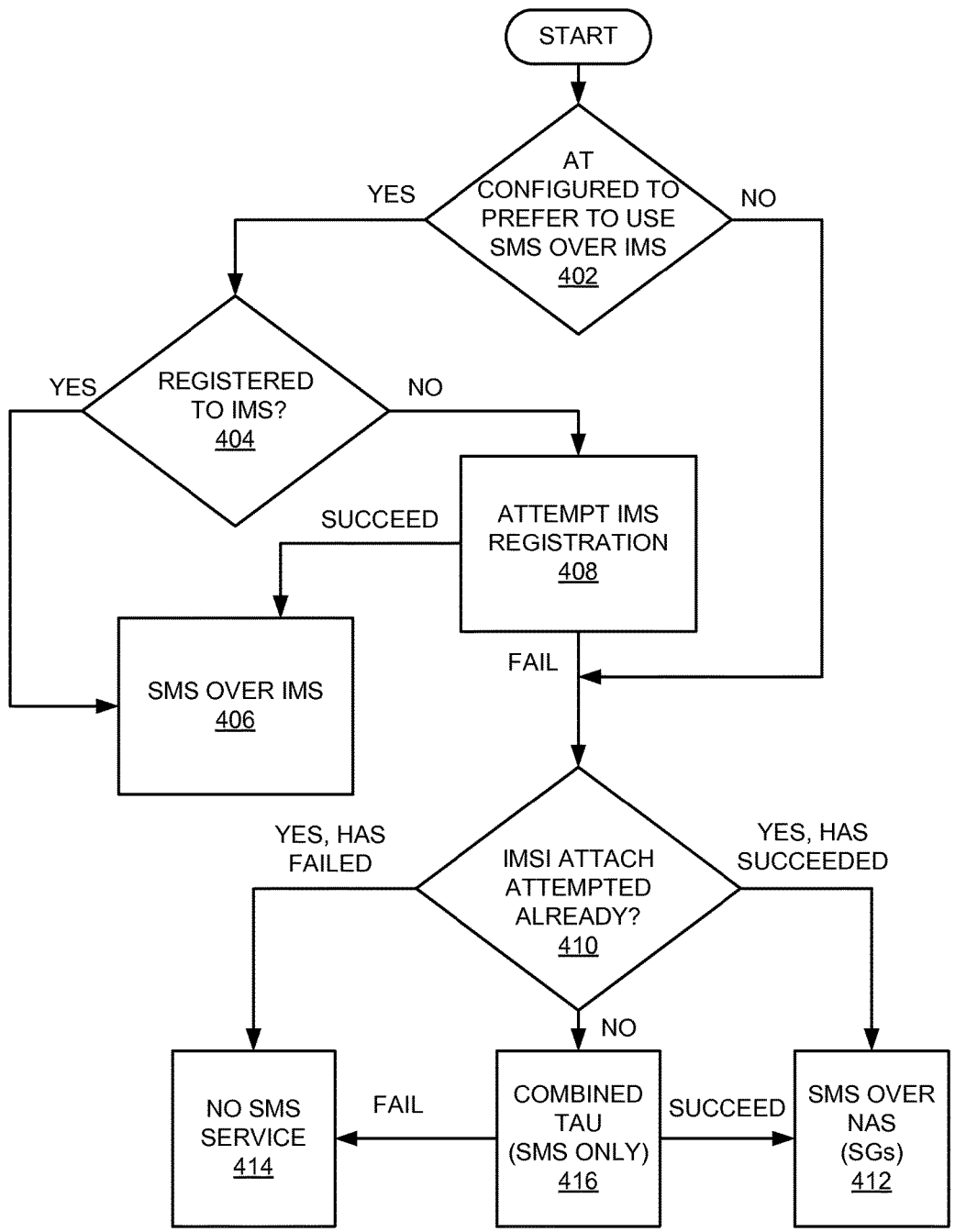
FIG. 4 is a flowchart of several sample aspects of operations that may be performed in conjunction with domain selection for an access terminal camping on E-UTRAN.

FIG. 4 describes sample SMS domain selection operations that may be performed for a CS/CSFB and IMS capable access terminal camping on E-UTRAN. In this example, it is assumed that the access terminal is already attached to EPS services (e.g., as a result of a voice domain selection process).

As represented by block 402, the access terminal determines whether it is configured to prefer to use SMS over IMS. For example, the access terminal may check the value of a maintained "SMS over IMS" indication as discussed herein.

If the access terminal is configured to use SMS over IMS, the access terminal tries to use SMS over IMS. Thus, as represented by block 404, the access terminal determines whether it is registered to IMS. For example, the access terminal may have already registered to IMS during voice domain selection. If the access terminal is registered to IMS, the access terminal selects the IMS domain and uses SMS over IMS (block 406).

If the access terminal was not already registered to IMS at block 404, the access terminal attempts to register to IMS at block 408. If the registration succeeds, the access terminal uses SMS over IMS (block 406).

If the IMS registration attempt at block 408 fails, the access terminal will try to use SMS over EPS NAS (SGs). Accordingly, as represented by block 410, the access terminal determines whether an IMSI attach has already been attempted (e.g., during voice domain selection). If an IMSI attach has already been attempted and has succeeded (i.e., the access terminal is already attached to non-EPS services), the access terminal selects the NAS domain and uses SMS over NAS (SGs) as represented by block 412.

Referring again to block 410, if an IMSI attach has already been attempted but has failed, SMS service is not available (block 414). In this case, the access terminal will stay in E-UTRAN (following the radio access technology selection that was made by the voice domain selection) without SMS service.

If the access terminal determines at block 410 that an IMSI attach has not yet been attempted, the access terminal attempts to register to the CS domain (e.g., register with an MSC) via a combined tracking area update (TAU) with IMSI attach (with "flag" SMS only) as represented by block 416. If this registration attempt succeeds, the access terminal uses SMS over NAS (SGs) at block 412. Otherwise, the access terminal will stay in E-UTRAN without SMS service (block 414).

Referring again to block 402, if the access terminal is not configured to use SMS over IMS, the access terminal will try to use SMS over NAS (SGs). Thus, the operational flow will proceed to block 410 where the access terminal will perform the conditional operations discussed above (e.g., the access terminal may register with a CS domain if needed).

Figure 5:
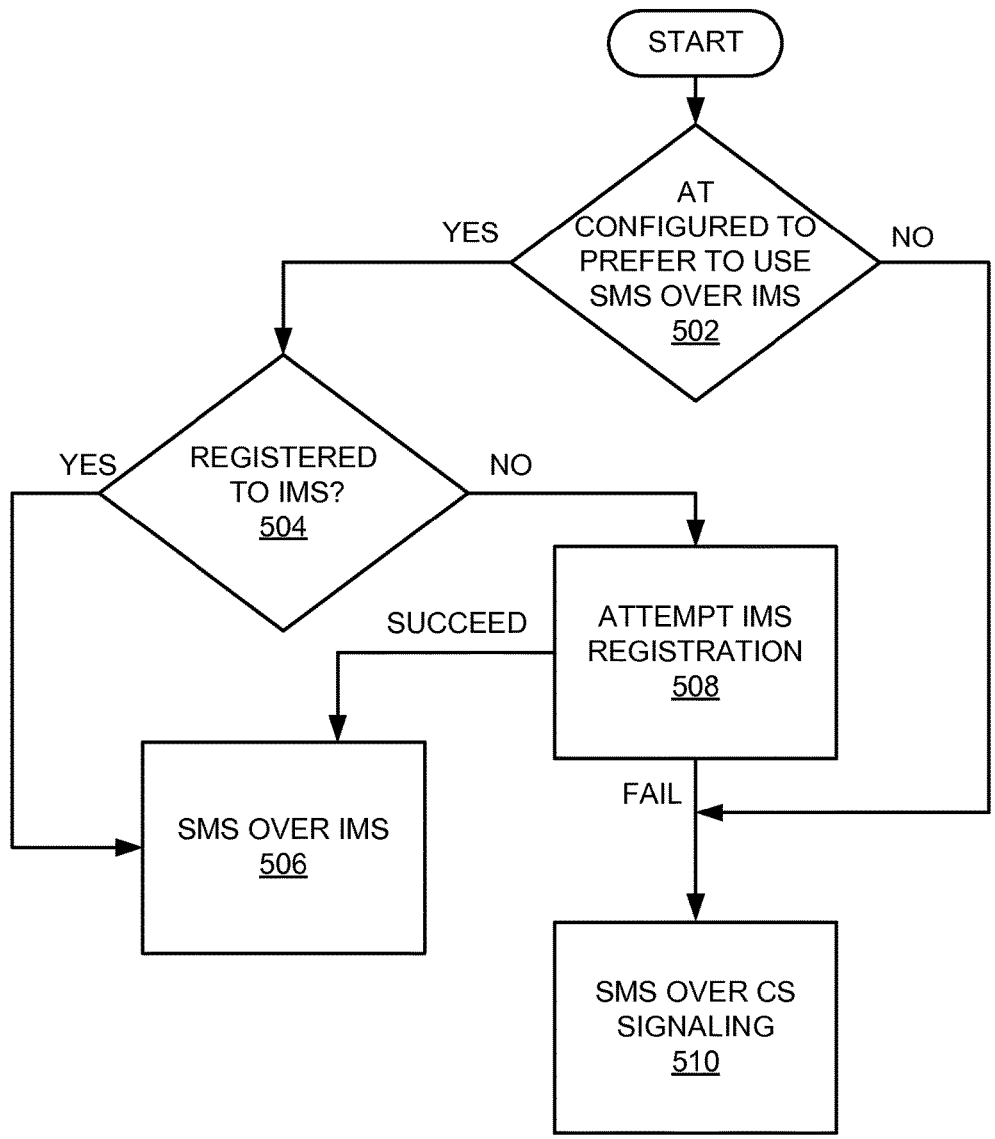
FIG. 5 is a flowchart of several sample aspects of operations that may be performed in conjunction with domain selection for an access terminal camping on UTRAN.

FIG. 5 describes sample SMS domain selection operations that may be performed for a CS and IMS capable access terminal camping on a 2G/3G radio access technology (e.g., UTRAN).

As represented by block 502, the access terminal determines whether it is configured to prefer to use SMS over IMS. If the access terminal is configured to use SMS over IMS, the access terminal determines whether it is registered to IMS at block 504. If it is registered, the access terminal uses SMS over IMS (block 506).

If the access terminal was not already registered to IMS at block 504, the access terminal attempts to register to IMS at block 508. If the registration succeeds, the access terminal uses SMS over IMS (block 506).

If the IMS registration attempt at block 508 fails, as represented by block 510, the access terminal will use SMS over NAS (CS signaling) which is always available in 2G/3G radio access technology.

Referring again to block 502, if the access terminal is not configured to use SMS over IMS, the access terminal will use SMS over NAS as represented by block 510.

Figure 6:
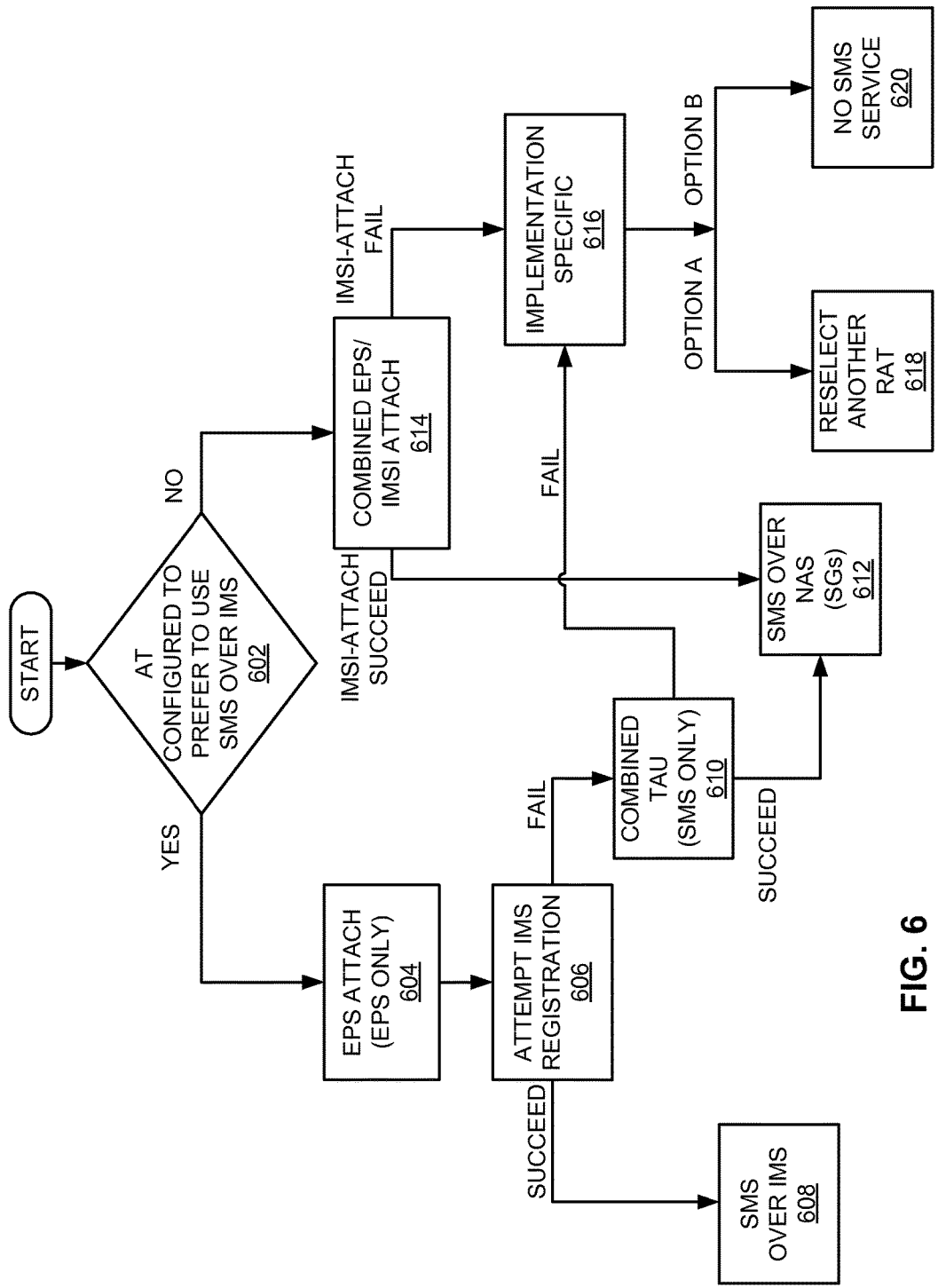
FIG. 6 is a flowchart of several sample aspects of one example of operations that may be performed in conjunction with domain selection for an access terminal camping on, but not attached to, E-UTRAN.
Figure 7:
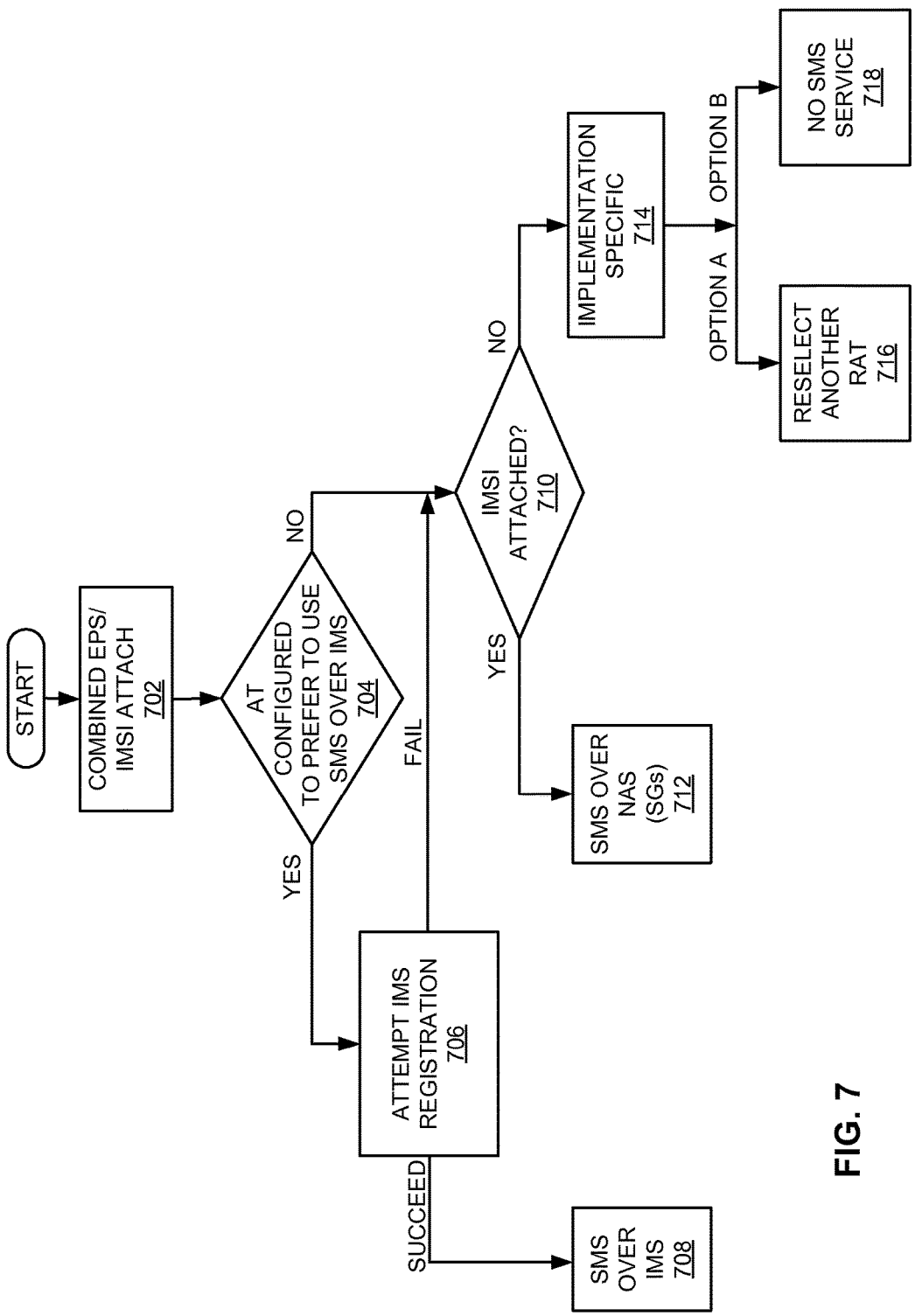
FIG. 7 is a flowchart of several sample aspects of another example of operations that may be performed in conjunction with domain selection for an access terminal camping on, but not attached to, E-UTRAN.

Referring now to FIGS. 6 and 7, in some cases, an access terminal will be camping on a network but not attached to the network when a mobile-originated SMS message is to be delivered. For example, some access terminals (e.g., data cards) that do not have voice call capability and do not perform voice domain selection may still use SMS. Hence, SMS domain selection as taught herein may be employed in such access terminals. FIGS. 6 and 7 describe two examples of how domain selection for a CS and IMS capable access terminal camping on E-UTRAN may be performed for the case where an access terminal is not attached (e.g., when voice domain selection does not apply).

In the example of FIG. 6, the access terminal performs an EPS/IMSI attach only if the access terminal is not configured to use SMS over IMS. Accordingly, as represented by block 602, the access terminal determines whether it is configured to prefer to use SMS over IMS. If so, as represented by block 604, the access terminal performs an EPS attach (EPS only) and then tries to use SMS over IMS. Thus, as represented by block 606, the access terminal attempts to register to IMS. If the registration succeeds, the access terminal uses SMS over IMS (block 608).

If the IMS registration attempt at block 606 fails, the access terminal will try to use SMS over NAS. Accordingly, as represented by block 610, the access terminal performs a combined Tracking Area Update (TAU) with IMSI attach. If this attach procedure succeeds, the access terminal uses SMS over NAS as represented by block 612.

If the attach procedure of block 610 fails, as represented by block 616, the action taken by the access terminal at this point may be implementation specific. As represented by block 618, in some implementations, the access terminal reselects to another radio access technology. As represented by block 620, in some implementations, the access terminal stays in E-UTRAN with no SMS service available.

Referring again to block 602, if the access terminal is not configured to use SMS over IMS, the access terminal will try to use SMS over NAS. In this case, the access terminal performs a combined EPS/IMSI attach. If this attach procedure succeeds, the access terminal uses SMS over NAS as represented by block 612. If the attach procedure of block 614 fails, the action taken by the access terminal at this point may be implementation specific as represented by block 616 (discussed above).

Referring now to FIG. 7, in this example, the access terminal always performs an EPS/IMSI attach, regardless of its SMS configuration. Accordingly, as represented by block 702, the access terminal initially performs a combined EPS/IMSI attach.

If this attach procedure succeeds, as represented by block 704, the access terminal determines whether it is configured to prefer to use SMS over IMS. If so, as represented by block 706, the access terminal attempts to register to IMS. If the registration succeeds, the access terminal uses SMS over IMS (block 708).

If the IMS registration attempt at block 706 fails, as represented by block 710, the access terminal determines whether it is IMSI attached. If so, the access terminal uses SMS over NAS as represented by block 712.

If the access terminal is not IMSI attached at block 710, as represented by block 714, the action taken by the access terminal at this point may be implementation specific. As represented by block 716, in some implementations, the access terminal reselects to another radio access technology. As represented by block 718, in some implementations, the access terminal stays in E-UTRAN with no SMS service available.

Referring again to block 704, if the access terminal is not configured to use SMS over IMS, the access terminal will try to use SMS over NAS. Hence, the operational flow will proceed to block 710 where the access terminal will perform the conditional operations discussed above.

Figure 8:
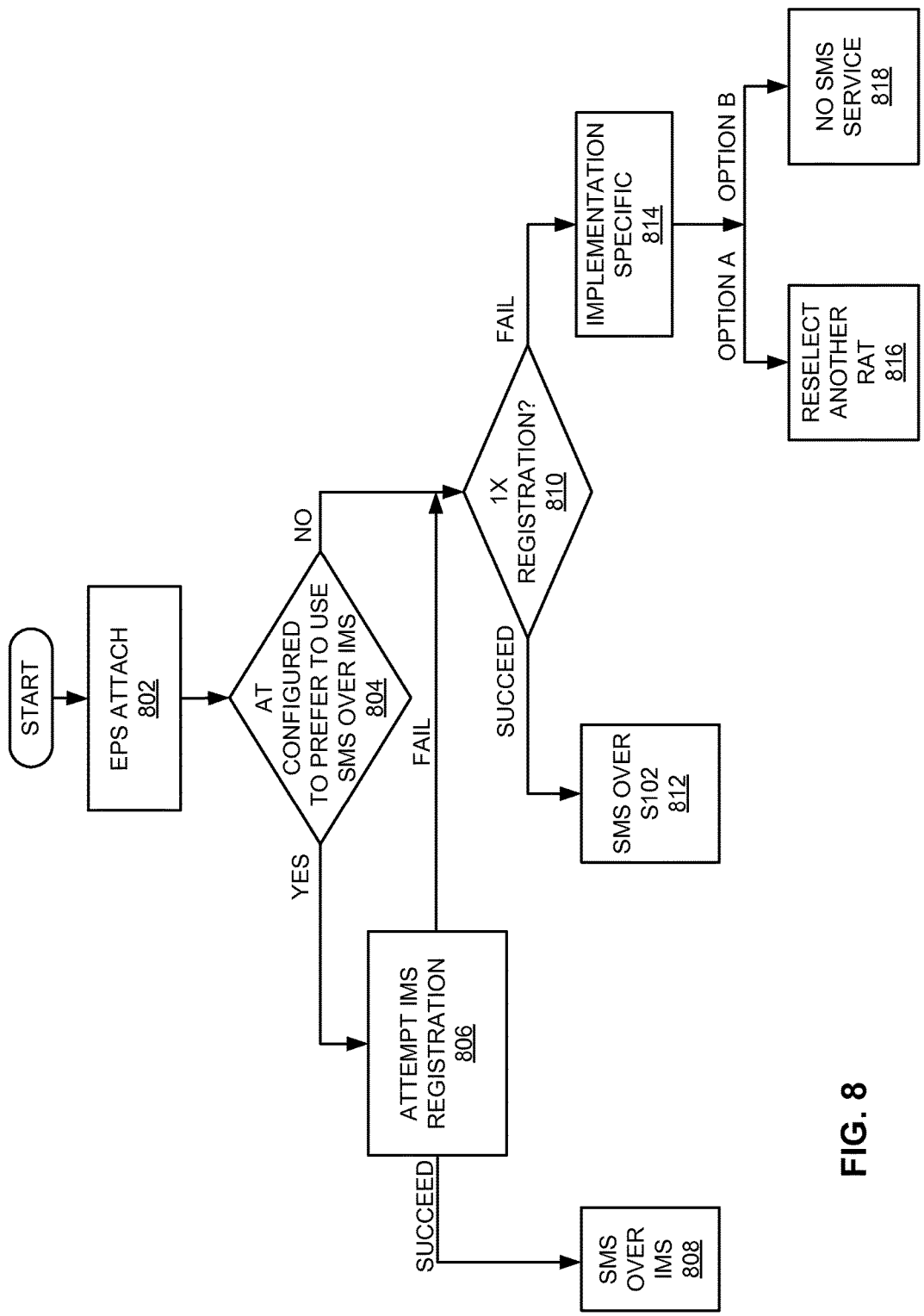
FIG. 8 is a flowchart of several sample aspects of operations that may be performed in conjunction with domain selection in a system that supports cdma2000 radio technology.

FIG. 8 describes sample operations that may be performed by an access terminal with E-UTRAN and cdma200, technology. In this case, an access terminal in E-UTRAN may use SMS over IMS or SMS over S102. SMS over S102 is accomplished using a cdma2000, protocol data unit (PDU) between the access terminal and the MME, and using an S102 tunnel between the MME and a CDMA 1x interworking function.

This example commences at block 802 with a 1x/LTE and IMS capable access terminal camping on E-UTRAN, but not attached. In the event the access terminal was already attached, the operational flow would commence at block 804.

As represented by block 802, the access terminal performs an EPS attach. If this attach procedure succeeds, as represented by block 804, the access terminal determines whether it is configured to prefer to use SMS over IMS. If so, as represented by block 806, the access terminal attempts to register to IMS. If the registration succeeds, the access terminal uses SMS over IMS (block 808).

If the IMS registration attempt at block 806 fails, as represented by block 810, the access terminal attempts CDMA 1x registration. If the registration is successful, the access terminal uses SMS over S102 as represented by block 812.

If the access terminal cannot register to CDMA 1x at block 810, as represented by block 814, the action taken by the access terminal at this point may be implementation specific. As represented by block 816, in some implementations, the access terminal reselects to another radio access technology. As represented by block 818, in some implementations, the access terminal stays in E-UTRAN with no SMS service available.

Referring again to block 804, if the access terminal is not configured to use SMS over IMS, the access terminal will try to use SMS over S102. Hence, the operational flow will proceed to block 810 where the access terminal will perform the conditional operations discussed above.

Figure 9:
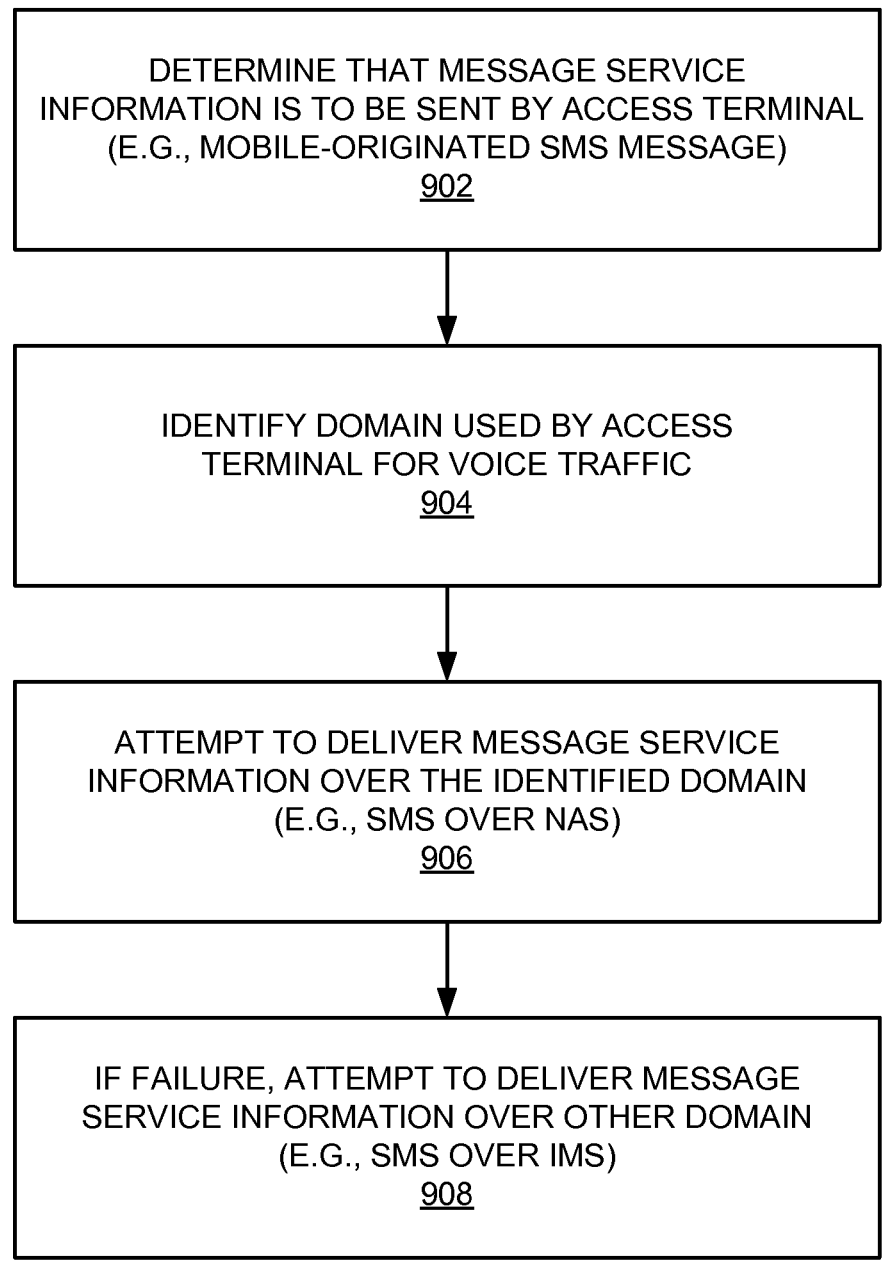
FIG. 9 is a flowchart of several sample aspects of operations that may be performed in conjunction with selecting a domain for delivering message service information based on a domain used for a specified type of traffic.

FIG. 9 illustrates an implementation that may be employed, for example, in a case where the access terminal is not configured to preferably use SMS over an IP domain (e.g., IMS). In this case, the access terminal may attempt to use for SMS the same domain that its uses for other traffic (e.g., voice traffic in the example of FIG. 9).

As represented by block 902, at some point in time the access terminal determines that it needs to send message service information. For example, as discussed above, a mobile-originated SMS message may need to be set to another entity via a network.

As represented by block 904, the access terminal identifies a domain that has been selected for voice traffic. For example, the access terminal may determine that SMS over NAS has been used for voice traffic.

As represented by block 906, the access terminal attempts to deliver the message service information over the identified domain. As represented at block 908, if this attempt fails, the access terminal may attempt to deliver the message service information over another domain (e.g., IMS).

As discussed above, access terminals that use different types of radio technologies may use the teachings herein to deliver SMS. FIGS. 10-13 illustrate in a simplified manner how SMS may be delivered over different domains provided by different radio technologies.

Figure 10:
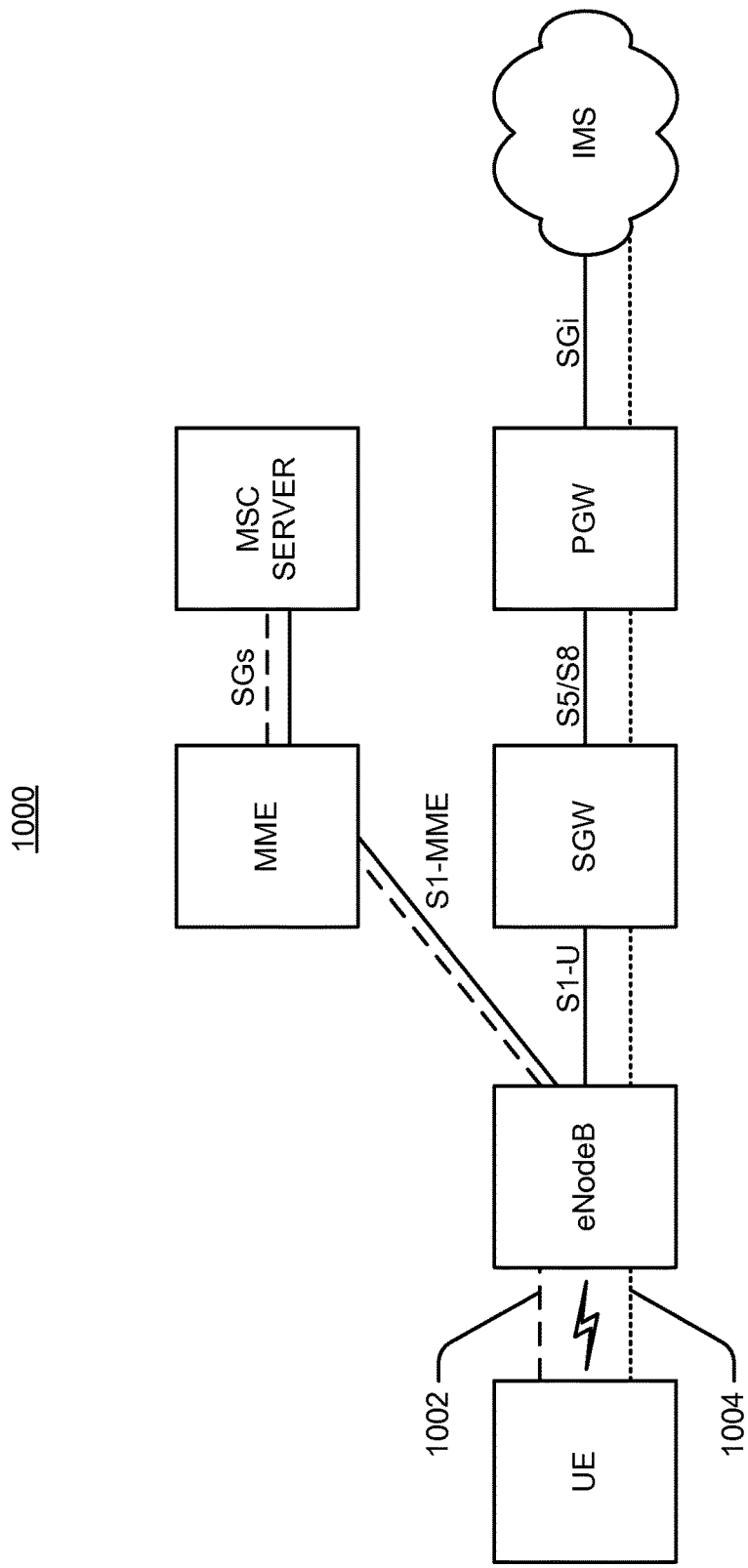
FIG. 10 is a simplified diagram illustrating different domains for delivery of message service information in a sample E-UTRAN communication system.

FIG. 10 depicts a simplified example of an E-UTRAN system 1000 (i.e., an LTE network). Here, user equipment (i.e., an access terminal) communicates via wireless signals with an eNodeB via an E-UTRA Uu interface.

The eNodeB communicates with an MME via an S1-MME interface. In addition, in this example the MME also communicates with an MSC server via an SGs interface. Hence, NAS domain signaling (as represented by the dashed line 1002) is available to the user equipment (UE) via the eNodeB, the MME and the MSC server.

The eNodeB also communicates with a serving gateway (SGW) via an S1-U interface. The SGW, in turn, communicates with a packet data network gateway (PGW) via an S5 or an S8 interface. The PGW communicates with packet data network entities such as an IP Multimedia Subsystem (IMS) via an SGi interface. Accordingly, IMS domain signaling (as represented by the dashed line 1004) is available to the UE via an IMS tunnel through the eNodeB, the SGW, the PGW, and the IMS.

Figure 11:
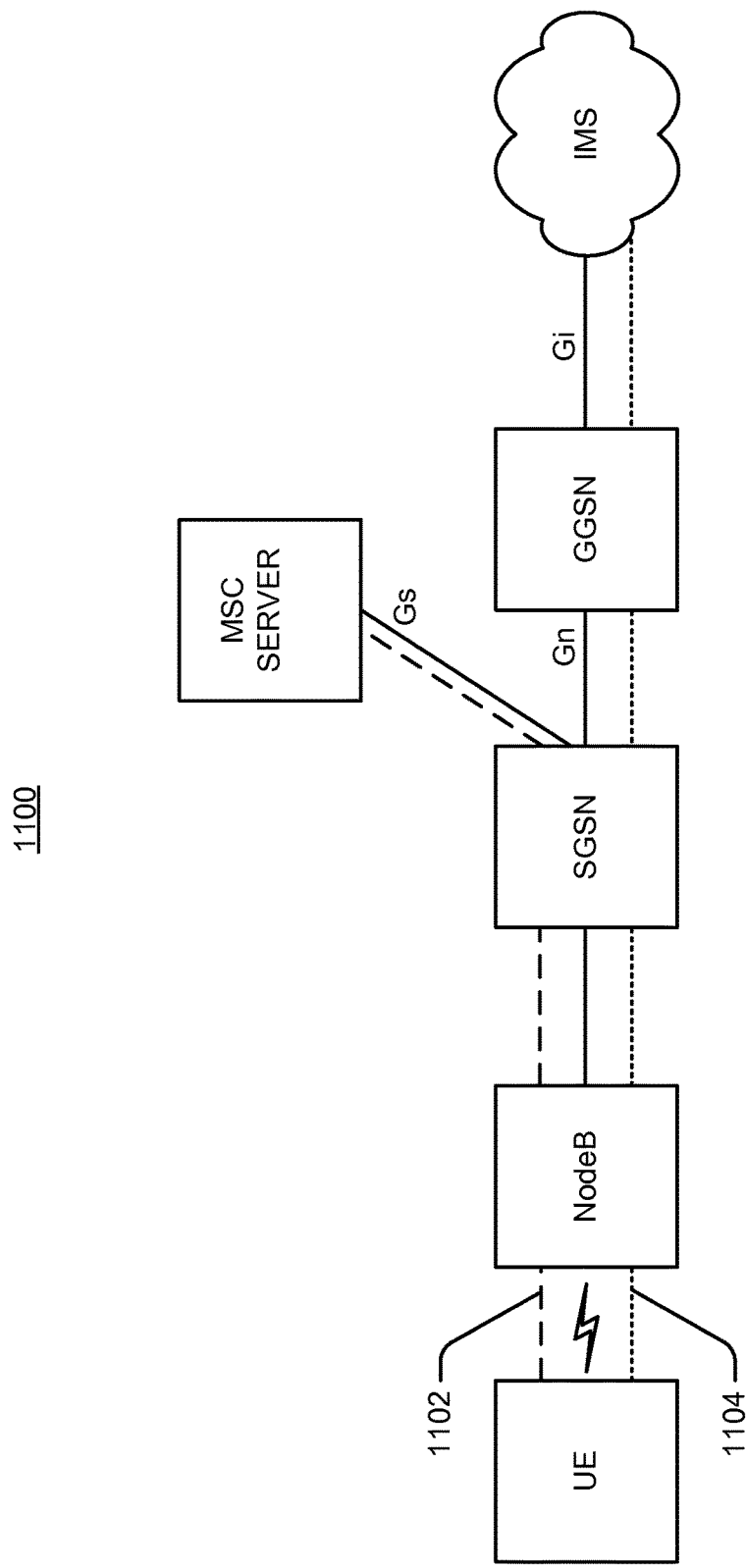
FIG. 11 is a simplified diagram illustrating different domains for delivery of message service information in a sample UTRAN communication system.

FIG. 11 depicts a simplified example of a UTRAN system 1100. In this case, a UE communicates via wireless signals with a NodeB via a UTRA Uu interface. The NodeB, in turn, communicates with an SGSN.

The SGSN communicates with an MSC server via a Gs interface. Thus, CS domain signaling (as represented by the dashed line 1102) is available to the UE via the NodeB, the SGSN, and the MSC server.

The SGSN also communicates with a gateway GPRS support node (GGSN) via a Gn interface. The GGSN, in turn, communicates with packet data network entities such as an IP Multimedia Subsystem (IMS) via a Gi interface. Accordingly, IMS domain signaling (as represented by the dashed line 1104) is available to the UE via an IMS tunnel through the NodeB, the SGSN, the GGSN, and the IMS.

Figure 12:
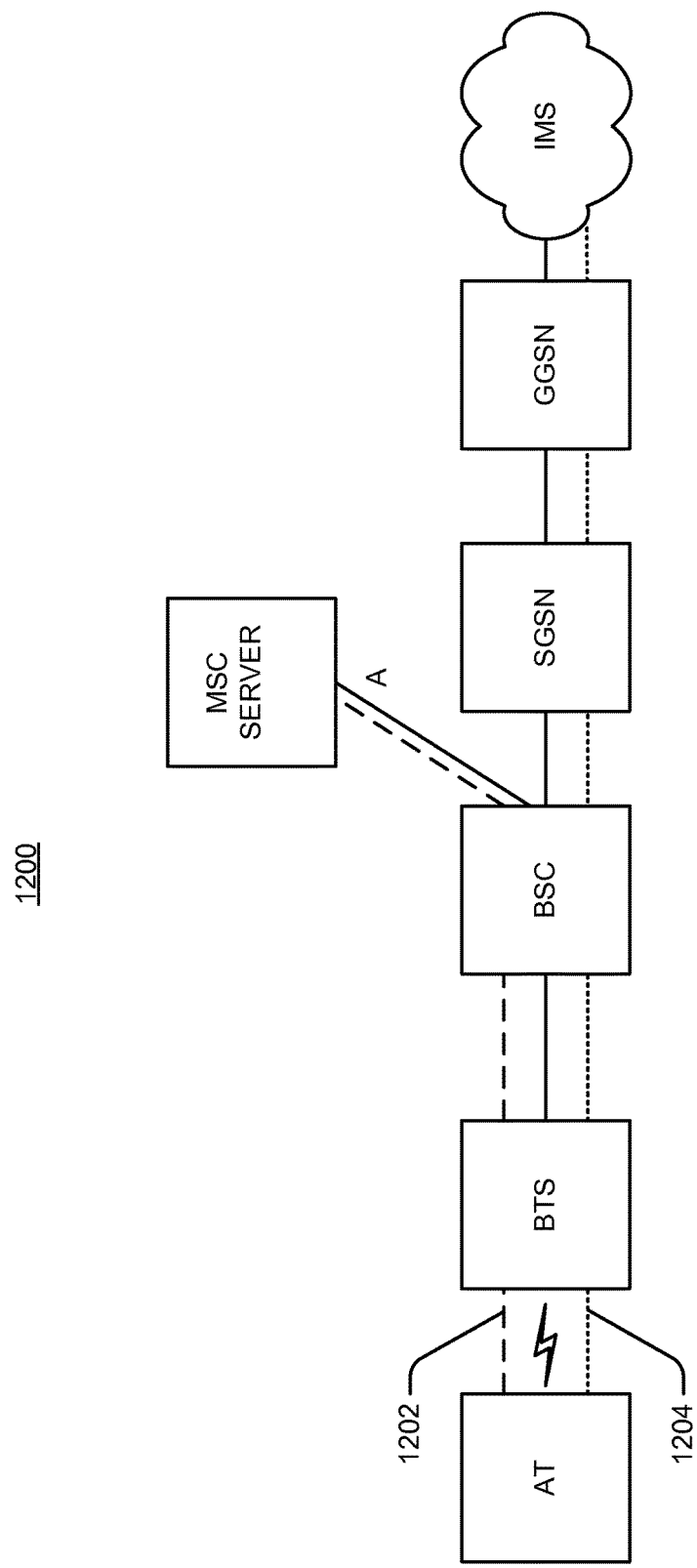
FIG. 12 is a simplified diagram illustrating different domains for delivery of message service information in a sample GERAN communication system.

FIG. 12 depicts a simplified example of a GERAN system 1200. Here, an access terminal (AT) communicates via wireless signals with a base station transceiver (BTS). The BTS, in turn, communicates with a base station controller (BSC).

The BSC communicates with an MSC server via an A interface. Thus, CS domain signaling (as represented by the dashed line 1202) is available to the UE via the BTS, the BSC, and the MSC server.

The BSC also communicates with an SGSN. The SGSN communicates with a GGSN that, in turn, communicates with packet data network entities such as an IP Multimedia Subsystem (IMS). Accordingly, IMS domain signaling (as represented by the dashed line 1204) is available to the AT via an IMS tunnel through the BTS, the BSC, the SGSN, the GGSN, and the IMS.

Figure 13:
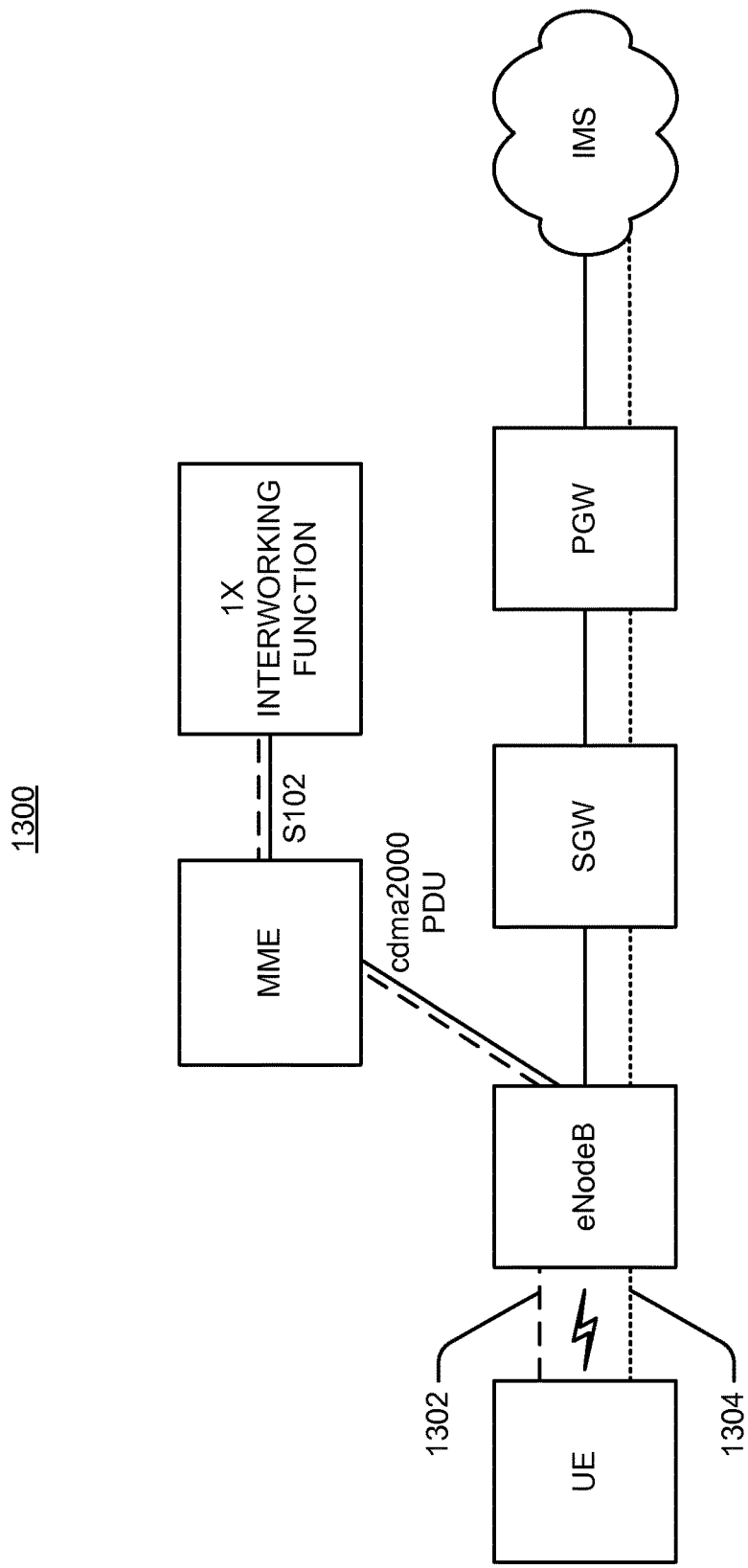
FIG. 13 is a simplified diagram illustrating a sample system that supports a cdma2000, domain for delivery of message service information.

FIG. 13 depicts a simplified example of an E-UTRAN system 1300 that provides cdma2000, connectivity. In a similar manner as described above for FIG. 10, the UE communicates via wireless signals with an eNodeB, and IMS domain signaling (as represented by the dashed line 1304) is available to the UE via an IMS tunnel through the eNodeB, the SGW, the PGW, and the IMS.

In this case, however, SMS domain signaling (as represented by the dashed line 1302) is provided via cdma2000, PDUs between the UE and the MME, and an S102 tunnel between the MME and a 1x interworking function.

Various advantages may be achieved through the use of the teachings herein. For example, SMS domain selection may be achieved using a single configuration parameter. Also, voice domain selection and SMS domain selection may be decoupled, thereby simplifying the domain selection procedure. Furthermore, access terminal behavior may be defined for various radio access technologies.

Figure 14:
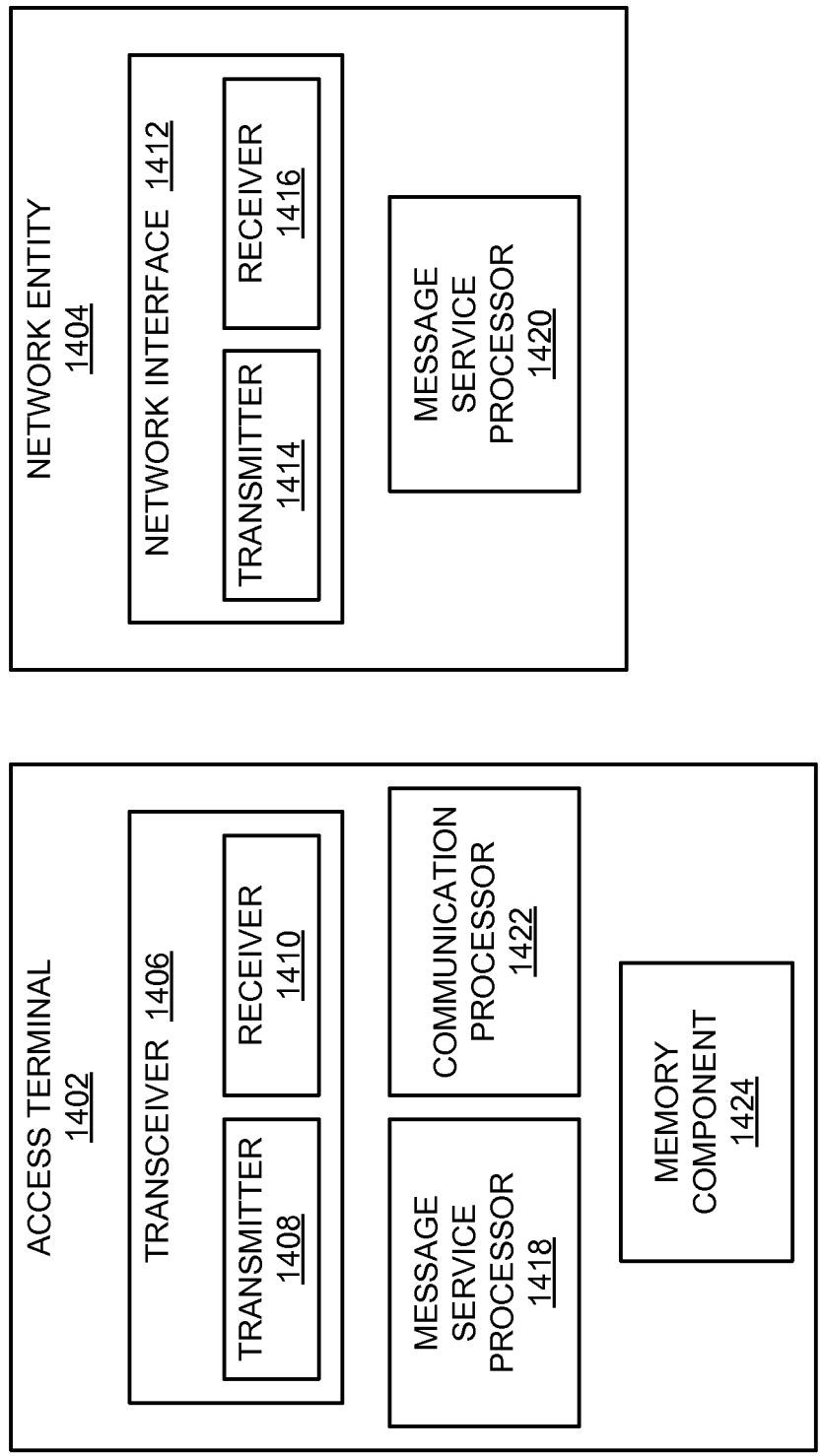
FIG. 14 is a simplified block diagram of several sample aspects of components that may be employed in communication nodes.

FIG. 14 illustrates several sample components that may be incorporated into nodes such as an access terminal 1402 (e.g., corresponding to access terminal 102), and a network entity 1404 (e.g., of a home PLMN) to perform message service operations as taught herein. In practice, the described components also may be incorporated into other nodes in a communication system. For example, other nodes in a system may include components similar to those described for the network entity 1404 to provide similar configuration functionality. Also, a given node may contain one or more of the described components. For example, an access terminal may contain multiple transceiver components that enable the access terminal to operate on multiple frequencies and/or communicate via different technologies.

As shown in FIG. 14, the access terminal 1402 includes a transceiver 1406 for communicating with other nodes. The transceiver 1406 includes a transmitter 1408 for sending signals (e.g., message service information such as SMS messages) and a receiver 1410 for receiving signals (e.g., message service indications).

The network entity 1404 includes a network interface 1412 for communicating with other nodes (e.g., other network nodes). For example, the network interface 1412 may be configured to communicate with one or more network nodes via a wire-based or wireless backhaul. In some aspects, the network interface 1412 may be implemented as a transceiver configured to support wire-based or wireless communication. To this end, the network interface 1412 is depicted as including a transmitter component 1414 (e.g., for sending message service indications) and a receiver component 1416 (e.g., for receiving messages).

The access terminal 1402 and the network entity 1404 also include other components that may be used in conjunction with message service operations as taught herein. For example, the access terminal 1402 includes a message service processor 1418 for performing message service-related operations (e.g., delivering message service information, identifying a domain, attempting to deliver message service information over a domain) and for providing other related functionality as taught herein. The access terminal 1402 also includes a communication processor 1422 for performing communication-related operations (e.g., determining that message service information is to be sent) and for providing other related functionality as taught herein. In addition, the access terminal 1402 includes a memory component 1424 (e.g., that comprises or interfaces with a memory device) for maintaining information (e.g., maintaining a message service indication) and for providing other related functionality as taught herein. The network entity 1404 includes a message service processor 1420 for performing message service-related operations (e.g., generating a message service indication) and for providing other related functionality as taught herein.

In some implementations, the components of FIG. 14 may be implemented in one or more processors (e.g., each of which uses and/or incorporates data memory for storing information or code used by the processor(s) to provide this functionality). For example, some of the functionality of block 1406 and some or all of the functionality of blocks 1418, 1422, and 1424 may be implemented by a processor or processors of an access terminal and data memory of the access terminal (e.g., by execution of appropriate code and/or by appropriate configuration of processor components). In addition, some of the functionality of block 1412 and some or all of the functionality of block 1420 may be implemented by a processor or processors of a network entity and data memory of the network entity (e.g., by execution of appropriate code and/or by appropriate configuration of processor components).

The teachings herein may be employed in a wireless multiple-access communication system that simultaneously supports communication for multiple wireless access terminals. Here, each terminal may communicate with one or more access points via transmissions on the forward and reverse links. The forward link (or downlink) refers to the communication link from the access points to the terminals, and the reverse link (or uplink) refers to the communication link from the terminals to the access points. This communication link may be established via a single-in-single-out system, a multiple-in-multiple-out (MIMO) system, or some other type of system.

A MIMO system employs multiple ($N_T$) transmit antennas and multiple ($N_R$) receive antennas for data transmission. A MIMO channel formed by the $N_T$, transmit and $N_R$, receive antennas may be decomposed into $N_S$, independent channels, which are also referred to as spatial channels, where $N_S \leq \min\{N_T, N_R\}$. Each of the $N_S$ independent channels corresponds to a dimension. The MIMO system may provide improved performance (e.g., higher throughput and/or greater reliability) if the additional dimensionalities created by the multiple transmit and receive antennas are utilized.

A MIMO system may support time division duplex (TDD) and frequency division duplex (FDD). In a TDD system, the forward and reverse link transmissions are on the same frequency region so that the reciprocity principle allows the estimation of the forward link channel from the reverse link channel. This enables the access point to extract transmit beam-forming gain on the forward link when multiple antennas are available at the access point.

Figure 15:
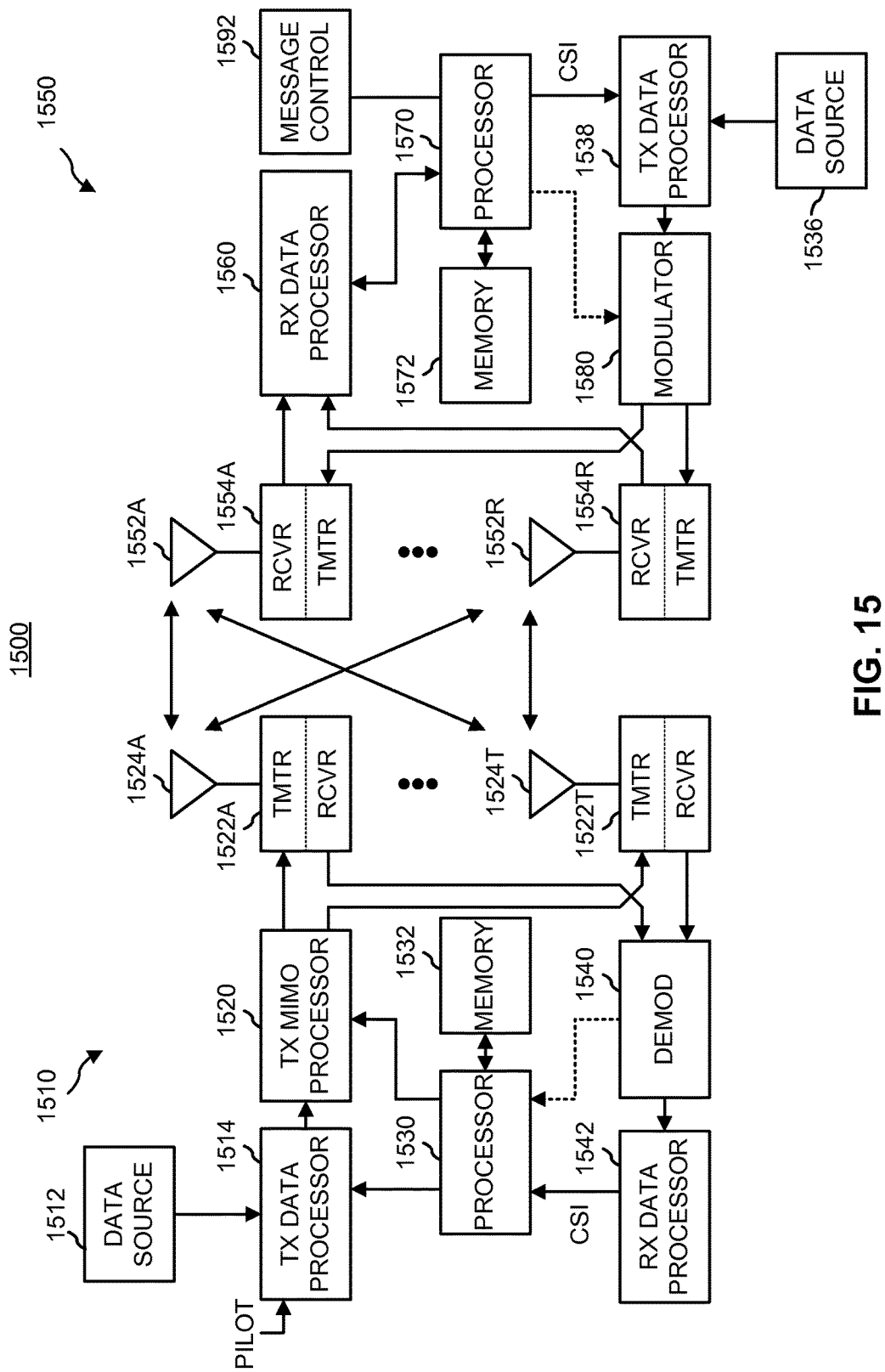
FIG. 15 is a simplified block diagram of several sample aspects of communication components.
Figure 16:
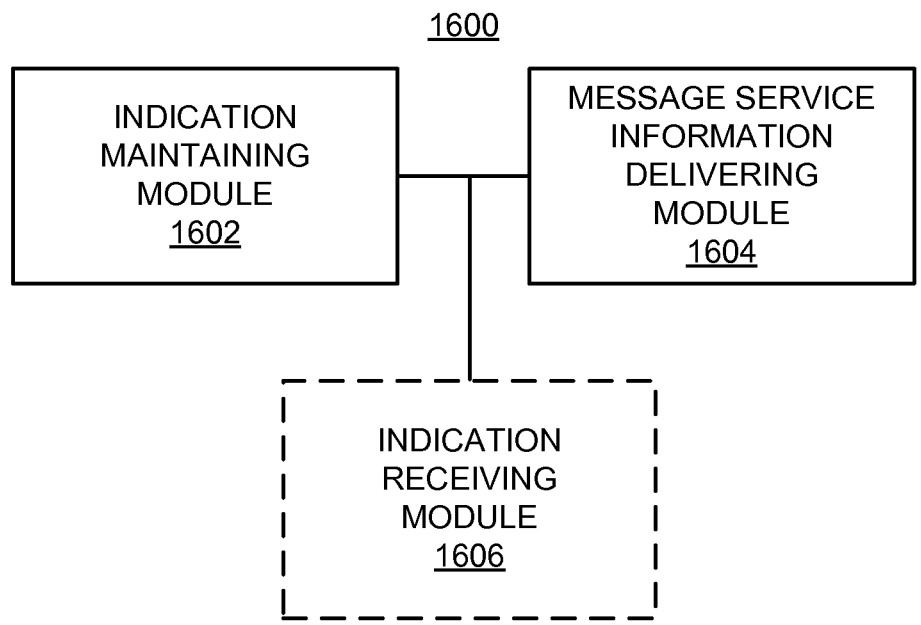
FIGS. 16-19 are simplified block diagrams of several sample aspects of apparatuses configured to support selection of a domain for delivering message service information as taught herein.
Figure 17:
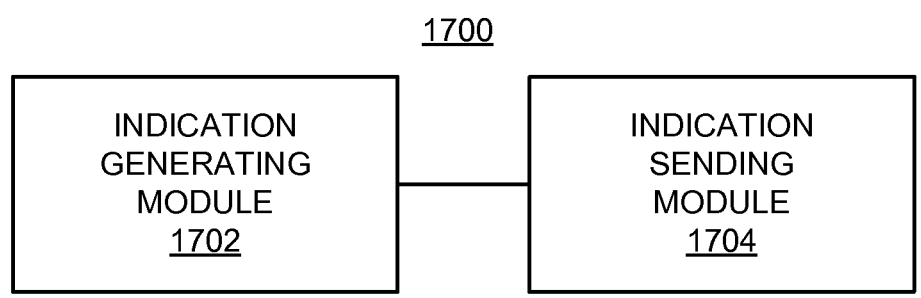
Figure 18:
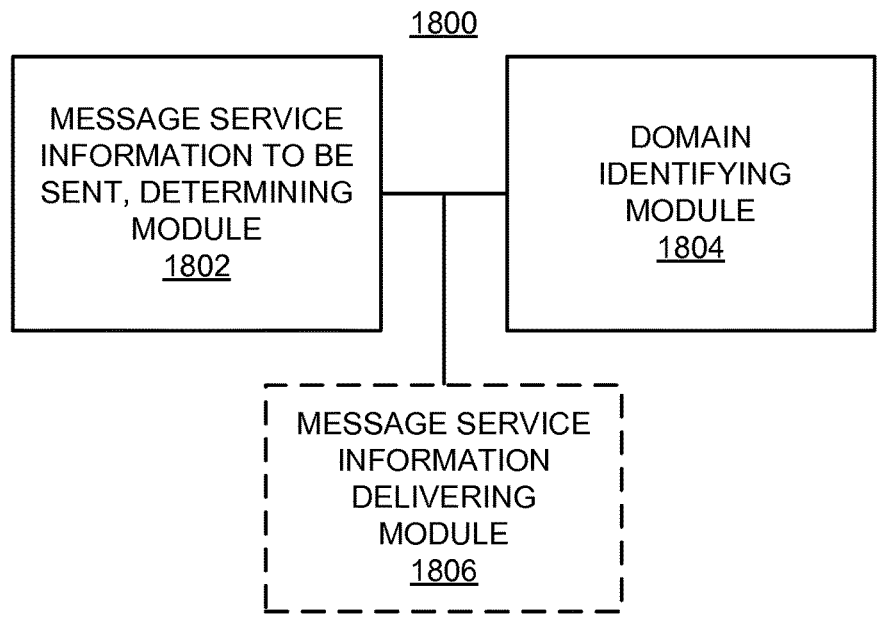
Figure 19:
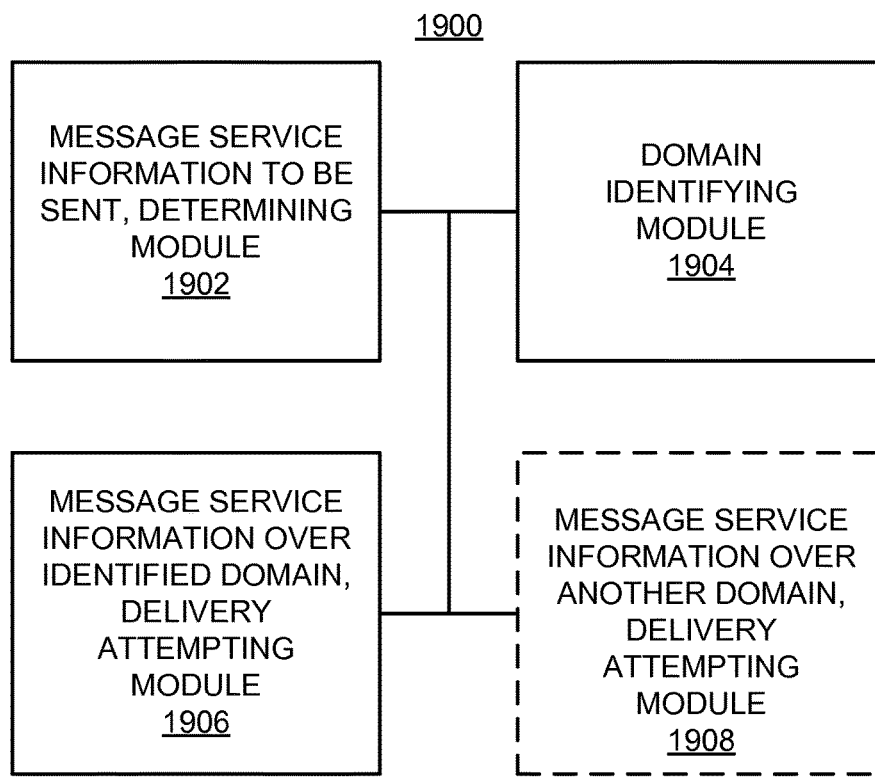

FIG. 15 illustrates a wireless device 1510 (e.g., an access point) and a wireless device 1550 (e.g., an access terminal) of a sample MIMO system 1500. At the device 1510, traffic data for a number of data streams is provided from a data source 1512 to a transmit (TX) data processor 1514. Each data stream may then be transmitted over a respective transmit antenna.

The TX data processor 1514 formats, codes, and interleaves the traffic data for each data stream based on a particular coding scheme selected for that data stream to provide coded data. The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 1530. A data memory 1532 may store program code, data, and other information used by the processor 1530 or other components of the device 1510.

The modulation symbols for all data streams are then provided to a TX MIMO processor 1520, which may further process the modulation symbols (e.g., for OFDM). The TX MIMO processor 1520 then provides $N_T$ modulation symbol streams to $N_T$ transceivers (XCVR) 1522A through 1522T. In some aspects, the TX MIMO processor 1520 applies beam-forming weights to the symbols of the data streams and to the antenna from which the symbol is being transmitted.

Each transceiver 1522 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transceivers 1522A through 1522T are then transmitted from $N_T$ antennas 1524A through 1524T, respectively.

At the device 1550, the transmitted modulated signals are received by $N_R$ antennas 1552A through 1552R and the received signal from each antenna 1552 is provided to a respective transceiver (XCVR) 1554A through 1554R. Each transceiver 1554 conditions (e.g., filters, amplifies, and downconverts) a respective received signal, digitizes the conditioned signal to provide samples, and further processes the samples to provide a corresponding "received" symbol stream.

A receive (RX) data processor 1560 then receives and processes the $N_R$ received symbol streams from $N_R$ transceivers 1554 based on a particular receiver processing technique to provide $N_T$ "detected" symbol streams. The RX data processor 1560 then demodulates, deinterleaves, and decodes each detected symbol stream to recover the traffic data for the data stream. The processing by the RX data processor 1560 is complementary to that performed by the TX MIMO processor 1520 and the TX data processor 1514 at the device 1510.

A processor 1570 periodically determines which pre-coding matrix to use (discussed below). The processor 1570 formulates a reverse link message comprising a matrix index portion and a rank value portion. A data memory 1572 may store program code, data, and other information used by the processor 1570 or other components of the device 1550.

The reverse link message may comprise various types of information regarding the communication link and/or the received data stream. The reverse link message is then processed by a TX data processor 1538, which also receives traffic data for a number of data streams from a data source 1536, modulated by a modulator 1580, conditioned by the transceivers 1554A through 1554R, and transmitted back to the device 1510.

At the device 1510, the modulated signals from the device 1550 are received by the antennas 1524, conditioned by the transceivers 1522, demodulated by a demodulator (DE-MOD) 1540, and processed by a RX data processor 1542 to extract the reverse link message transmitted by the device 1550. The processor 1530 then determines which pre-coding matrix to use for determining the beam-forming weights then processes the extracted message.

FIG. 15 also illustrates that the communication components may include one or more components that perform message control operations as taught herein. For example, a message control component 1592 may cooperate with the processor 1570 and/or other components of the device 1550 to send message service information to another device (e.g., via device 1510). It should be appreciated that for each device 1510 and 1550 the functionality of two or more of the described components may be provided by a single component. For example, a single processing component may provide the functionality of the message control component 1592 and the processor 1570.

The teachings herein may be incorporated into various types of communication systems and/or system components. In some aspects, the teachings herein may be employed in a multiple-access system capable of supporting communication with multiple users by sharing the available system resources (e.g., by specifying one or more of bandwidth, transmit power, coding, interleaving, and so on). For example, the teachings herein may be applied to any one or combinations of the following technologies: Code Division Multiple Access (CDMA) systems, Multiple-Carrier CDMA (MCCDMA), Wideband CDMA (W-CDMA), High-Speed Packet Access (HSPA, HSPA+) systems, Time Division Multiple Access (TDMA) systems, Frequency Division Multiple Access (FDMA) systems, Single-Carrier FDMA (SC-FDMA) systems, Orthogonal Frequency Division Multiple Access (OFDMA) systems, or other multiple access techniques. A wireless communication system employing the teachings herein may be designed to implement one or more standards, such as IS-95, cdma2000,, IS-856,, W-CDMA, TDSCDMA, and other standards. A CDMA network may implement a radio technology such as Universal Terrestrial Radio Access (UTRA), cdma2000,, or some other technology. UTRA includes W-CDMA and Low Chip Rate (LCR). The cdma2000, technology covers IS-2000,, IS-95, and IS-856, standards. A TDMA network may implement a radio technology such as Global System for Mobile Communications (GSM). An OFDMA network may implement a radio technology such as Evolved UTRA (E-UTRA), IEEE 802.11,, IEEE 802.16,, IEEE 802.20,, Flash-OFDM®, etc. UTRA, E-UTRA, and GSM are part of Universal Mobile Telecommunication System (UMTS). The teachings herein may be implemented in a 3GPP Long Term Evolution (LTE) system, an Ultra-Mobile Broadband (UMB) system, and other types of systems. LTE is a release of UMTS that uses E-UTRA. UTRA, E-UTRA, GSM, UMTS and LTE are described in documents from an organization named "3rd Generation Partnership Project" (3GPP), while cdma2000, is described in documents from an organization named "3rd Generation Partnership Project 2" (3GPP2). Although certain aspects of the disclosure may be described using 3GPP terminology, it is to be understood that the teachings herein may be applied to 3GPP (e.g., Re199,, Re15,, Re16,, Re17) technology, as well as 3GPP2, (e.g., 1xRTT, 1xEV-DO Re10,, RevA, RevB) technology and other technologies.

The teachings herein may be incorporated into (e.g., implemented within or performed by) a variety of apparatuses (e.g., nodes). In some aspects, a node (e.g., a wireless node) implemented in accordance with the teachings herein may comprise an access point or an access terminal.

For example, an access terminal may comprise, be implemented as, or known as user equipment, a subscriber station, a subscriber unit, a mobile station, a mobile, a mobile node, a remote station, a remote terminal, a user terminal, a user agent, a user device, or some other terminology. In some implementations an access terminal may comprise a cellular telephone, a cordless telephone, a session initiation protocol (SIP) phone, a wireless local loop (WLL) station, a personal digital assistant (PDA), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music device, a video device, or a satellite radio), a global positioning system device, or any other suitable device that is configured to communicate via a wireless medium.

An access point may comprise, be implemented as, or known as a NodeB, an eNodeB, a radio network controller (RNC), a base station (BS), a radio base station (RBS), a base station controller (BSC), a base transceiver station (BTS), a transceiver function (TF), a radio transceiver, a radio router, a basic service set (BSS), an extended service set (ESS), a macro cell, a macro node, a Home eNB (HeNB), a femto cell, a femto node, a pico node, or some other similar terminology.

In some aspects a node (e.g., an access point) may comprise an access node for a communication system. Such an access node may provide, for example, connectivity for or to a network (e.g., a wide area network such as the Internet or a cellular network) via a wired or wireless communication link to the network. Accordingly, an access node may enable another node (e.g., an access terminal) to access a network or some other functionality. In addition, it should be appreciated that one or both of the nodes may be portable or, in some cases, relatively non-portable.

Also, it should be appreciated that a wireless node may be capable of transmitting and/or receiving information in a non-wireless manner (e.g., via a wired connection). Thus, a receiver and a transmitter as discussed herein may include appropriate communication interface components (e.g., electrical or optical interface components) to communicate via a non-wireless medium.

A wireless node may communicate via one or more wireless communication links that are based on or otherwise support any suitable wireless communication technology. For example, in some aspects a wireless node may associate with a network. In some aspects the network may comprise a local area network or a wide area network. A wireless device may support or otherwise use one or more of a variety of wireless communication technologies, protocols, or standards such as those discussed herein (e.g., CDMA, TDMA, OFDM, OFDMA, WiMAX, Wi-Fi, and so on). Similarly, a wireless node may support or otherwise use one or more of a variety of corresponding modulation or multiplexing schemes. A wireless node may thus include appropriate components (e.g., air interfaces) to establish and communicate via one or more wireless communication links using the above or other wireless communication technologies. For example, a wireless node may comprise a wireless transceiver with associated transmitter and receiver components that may include various components (e.g., signal generators and signal processors) that facilitate communication over a wireless medium.

The functionality described herein (e.g., with regard to one or more of the accompanying figures) may correspond in some aspects to similarly designated "means for" functionality in the appended claims. Referring to FIGS. 16-19, apparatuses 1600, 1700, 1800, and 1900 are represented as a series of interrelated functional modules. Here, an indication maintaining module 1602 may correspond at least in some aspects to, for example, a memory component as discussed herein. A message service information delivering module 1604 may correspond at least in some aspects to, for example, a message service processor as discussed herein. An indication receiving module 1606 may correspond at least in some aspects to, for example, a receiver as discussed herein. An indication generating module 1702 may correspond at least in some aspects to, for example, a message service processor as discussed herein. An indication sending module 1704 may correspond at least in some aspects to, for example, a transmitter as discussed herein. A message service information to be sent, determining module 1802 may correspond at least in some aspects to, for example, a communication processor as discussed herein. A domain identifying module 1804 may correspond at least in some aspects to, for example, a message service processor as discussed herein. A message service information delivering module 1806 may correspond at least in some aspects to, for example, a message service processor as discussed herein. A message service information to be sent, determining module 1902 may correspond at least in some aspects to, for example, a communication processor as discussed herein. A domain identifying module 1904 may correspond at least in some aspects to, for example, a message service processor as discussed herein. A message service information over identified domain, delivery attempting module 1906 may correspond at least in some aspects to, for example, a message service processor as discussed herein. A message service information over another domain, delivery attempting module 1908 may correspond at least in some aspects to, for example, a message service processor as discussed herein.

The functionality of the modules of FIGS. 16-19 may be implemented in various ways consistent with the teachings herein. In some aspects the functionality of these modules may be implemented as one or more electrical components. In some aspects the functionality of these blocks may be implemented as a processing system including one or more processor components. In some aspects the functionality of these modules may be implemented using, for example, at least a portion of one or more integrated circuits (e.g., an ASIC). As discussed herein, an integrated circuit may include a processor, software, other related components, or some combination thereof. The functionality of these modules also may be implemented in some other manner as taught herein. In some aspects one or more of any dashed blocks in FIGS. 16-19 are optional.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of: A, B, or C" used in the description or the claims means "A or B or C or any combination of these elements."

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented within or performed by an integrated circuit (IC), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. It should be appreciated that a computer-readable medium may be implemented in any suitable computer-program product.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope consistent with the principles and novel features disclosed herein.

What is claimed is:

1. A method of communication, comprising:
   determining that message service information is to be sent by an access terminal subsequent to the access terminal storing an indication that indicates whether a message service originated by the access terminal is preferred to be invoked over an Internet Protocol (IP) domain or that the message service is not to be invoked over the IP domain;
   identifying a domain for delivering the message service information based on the indication stored at the access terminal, wherein the domain for delivering the message service information is identified when the access terminal originates the message service, wherein identifying the domain comprises:
      determining whether the message service information can be delivered over non-access stratum (NAS) signaling in response to the stored indication indicating that the message service is not to be invoked over the IP domain, wherein determining whether the message service information can be delivered over NAS signaling comprises:
         attempting a combined Evolved Packet System (EPS) and International Mobile Subscriber Identity (IMSI) attach procedure; and
         determining the message service information can be delivered over NAS signaling if the combined EPS and IMSI attach is successful; and
   sending the message service information from the access terminal over the identified domain.

2. The method of claim 1, wherein the message service comprises Short Message Service (SMS).

3. The method of claim 2, wherein the IP domain comprises an IMS domain.

4. The method of claim 1, wherein identifying the domain comprises determining whether the message service information can be delivered over IMS signaling in response to the indication stored at the access terminal indicating that the message service is preferred to be invoked over the IP domain.

5. The method of claim 4, wherein determining whether the message service information can be delivered over IMS signaling comprises determining whether the access terminal is registered to an IMS in response to the access terminal having a current communication attachment with a network.

6. The method of claim 4, wherein determining whether the message service information can be delivered over IMS signaling comprises performing an attach procedure with the network and then attempting to register the access terminal to an IMS in response to the access terminal not having a current communication attachment with a network.

7. The method of claim 6, wherein the attach procedure comprises an EPS-only attach procedure.

8. The method of claim 6, wherein the attach procedure comprises a combined EPS and IMSI attach procedure.

9. The method of claim 4, wherein identifying the domain comprises determining whether the message service information can be delivered over NAS signaling in response to determining that the message service information cannot be delivered over IMS signaling.

10. The method of claim 1, wherein determining whether the message service information can be delivered over NAS signaling comprises determining whether an IMSI attach procedure has previously succeeded in response to the access terminal having a current communication attachment with an Evolved-UMTS Terrestrial Radio Access Network (RAN).

11. The method of claim 9, wherein determining whether the message service information can be delivered over NAS signaling comprises:
   determining whether the access terminal has a current communication attachment with an Evolved-UMTS Terrestrial Radio Access Network (RAN); and
   attempting a combined Tracking Area Update (TAU) for Short Message Service (SMS) in response to determining that the access terminal has a current communication attachment with the Evolved-UMTS Terrestrial RAN and that an IMSI attach procedure was not previously attempted.

12. The method of claim 9, wherein determining whether the message service information can be delivered over NAS signaling comprises attempting a combined EPS and IMSI attach procedure and determining whether the attach procedure was successful in response to the access terminal not having a current communication attachment with an Evolved-UMTS Terrestrial Radio Access Network (RAN).

13. The method of claim 4, wherein identifying the domain comprises selecting NAS over circuit switch signaling in response to determining that the access terminal has a current communication attachment with a UMTS Terrestrial Radio Access Network (RAN) and that the message service information cannot be delivered over IMS signaling.

14. The method of claim 4, wherein identifying the domain comprises attempting a CDMA 1x registration to deliver the message service information over an S102 interface in response to determining that the message service information cannot be delivered over IMS signaling.

15. The method of claim 1, wherein determining whether the message service information can be delivered over NAS signaling comprises attempting a combined Tracking Area Update (TAU) for Short Message Service (SMS) in response to determining that the access terminal has a current communication attachment with an Evolved-UMTS Terrestrial Radio Access Network (RAN) and that an IMSI attach procedure was not previously attempted.

16. The method of claim 1, wherein identifying the domain comprises selecting NAS over circuit switch signaling in response to the access terminal having a current communication attachment with a UMTS Terrestrial Radio Access Network and the stored indication indicating that the message service is not to be invoked over the IP domain.

17. The method of claim 1, wherein identifying the domain comprises attempting a CDMA 1x registration to deliver the message service information over an S102 interface in response to the stored indication indicating that the message service is not to be invoked over the IP domain.

18. The method of claim 1, wherein identifying the domain comprises determining whether the message service information can be delivered over IMS signaling based on whether an IMSI attach procedure has previously succeeded in response to the stored indication indicating that the message service is preferred to be invoked over the IP domain.

19. The method of claim 1, wherein the access terminal does not have a current communication attachment with a network when the domain for delivering the message service information is identified.

20. The method of claim 1, further comprising:
   receiving the indication from a home public and mobile network (HPLMN) operator; and
   storing the indication at the access terminal, wherein the indication indicates the HPLMN operator prefers whether the message service originated by the access terminal is invoked over the IP domain or that the message service is not to be invoked over the IP domain.

21. The method of claim 1, wherein:
   determining whether the message service information can be delivered over NAS signaling comprises:
     determining the message service information cannot be delivered over NAS signaling if the combined EPS and IMSI attach fails; and
   the method further comprises:
     determining the message service information is not to be sent based on the determination that the message service information cannot be delivered over NAS and the stored indication indicating that the message service information is not to be invoked over IMS signaling.

22. An apparatus for communication, comprising:
   a memory configured to store an indication that indicates whether a message service originated by an access terminal is preferred to be invoked over an Internet Protocol (IP) domain or that the message service is not to be invoked over the IP domain;
   a communication processor configured to determine that message service information is to be sent by the access terminal subsequent to storing the indication in the memory; and
   a message service processor configured to identify a domain for delivering the message service information based on the indication stored in the memory, wherein the message service processor is configured to identify the domain for delivering the message service information when the access terminal originates the message service, and wherein the message service processor is further configured to send the message service information from the access terminal over the identified domain, wherein the message service processor is configured to identify the domain by:

determining whether the message service information can be delivered over non-access stratum (NAS) signaling in response to the stored indication indicating that the message service is not to be invoked over the IP domain, wherein determining whether the message service information can be delivered over NAS signaling comprises:
  attempting a combined Evolved Packet System (EPS) and International Mobile Subscriber Identity (IMSI) attach procedure; and
  determining the message service information can be delivered over NAS signaling if the combined EPS and IMSI attach is successful.

23. The apparatus of claim 22, wherein the message service comprises Short Message Service (SMS).

24. The apparatus of claim 23, wherein the IP domain comprises an IMS domain.

25. The apparatus of claim 22, wherein the message service processor is further configured to identify the domain by determining whether the message service information can be delivered over IMS signaling in response to the stored indication indicating that the message service is preferred to be invoked over the IP domain.

26. The apparatus of claim 25, wherein the message service processor is further configured to identify the domain by determining whether the message service information can be delivered over NAS signaling in response to determining that the message service information cannot be delivered over IMS signaling.

27. The apparatus of claim 26, wherein the message service processor is further configured to determine whether the message service information can be delivered over NAS signaling by attempting a combined Tracking Area Update (TAU) for Short Message Service (SMS) in response to determining that the access terminal has a current communication attachment with an Evolved-UMTS Terrestrial RAN and that an IMSI attach procedure was not previously attempted.

28. The apparatus of claim 25, wherein the message service processor is further configured to identify the domain by attempting a CDMA 1x registration to deliver the message service information over an S102 interface in response to determining that the message service information cannot be delivered over IMS signaling.

29. The apparatus of claim 22, wherein the message service processor is further configured to identify the domain by determining whether the message service information can be delivered over IMS signaling based on whether an IMSI attach procedure has previously succeeded in response to the stored indication indicating that the message service is preferred to be invoked over the IP domain.

30. The apparatus of claim 22, wherein the message service processor is integrated with the access terminal.

31. The apparatus of claim 22, wherein the access terminal does not have a current communication attachment with a network when the domain for delivering the message service information is identified.

32. The apparatus of claim 22, wherein the message service processor is further configured to determine whether the message service information can be delivered over NAS signaling by attempting a combined Tracking Area Update (TAU) for Short Message Service (SMS) in response to determining that the access terminal has a current communication attachment with an Evolved-UMTS Terrestrial RAN and that an IMSI attach procedure was not previously attempted.

33. An apparatus for communication, comprising:
  means for determining that message service information is to be sent by an access terminal subsequent to the access terminal storing an indication that indicates whether a message service originated by the access terminal is preferred to be invoked over an Internet Protocol (IP) domain or that the message service is not to be invoked over the IP domain;
  means for identifying a domain for delivering the message service information based on the indication stored at the access terminal, wherein the domain for delivering the message service information is identified when the access terminal originates the message service wherein identifying the domain comprises:
    determining whether the message service information can be delivered over non-access stratum (NAS) signaling in response to the stored indication indicating that the message service is not to be invoked over the IP domain, wherein determining whether the message service information can be delivered over NAS signaling comprises:
      attempting a combined Evolved Packet System (EPS) and International Mobile Subscriber Identity (IMSI) attach procedure; and
      determining the message service information can be delivered over NAS signaling if the combined EPS and IMSI attach is successful; and
  means for sending the message service information from the access terminal over the identified domain.

34. The apparatus of claim 33, wherein the message service comprises Short Message Service (SMS).

35. The apparatus of claim 34, wherein the IP domain comprises an IMS domain.

36. The apparatus of claim 28, wherein the means for identifying the domain comprises means for determining whether the message service information can be delivered over IMS signaling in response to the indication stored at the access terminal indicating that the message service is preferred to be invoked over the IP domain.

37. The apparatus of claim 36, wherein the means for identifying the domain comprises means for determining whether the message service information can be delivered over NAS signaling in response to determining that the message service information cannot be delivered over IMS signaling.

38. The apparatus of claim 37, wherein the means for determining whether the message service information can be delivered over NAS signaling comprises means for attempting a combined Tracking Area Update (TAU) for Short Message Service (SMS) in response to determining that the access terminal has a current communication attachment with an Evolved-UMTS Terrestrial RAN and that an IMSI attach procedure was not previously attempted.

39. The apparatus of claim 36, wherein the means for identifying the domain comprises means for attempting a CDMA 1x registration to deliver the message service information over an S102 interface in response to determining that the message service information cannot be delivered over IMS signaling.

40. The apparatus of claim 33, wherein the means for identifying the domain comprises means for determining whether the message service information can be delivered over IMS signaling based on whether an IMSI attach procedure has previously succeeded in response to the stored indication indicating that the message service is preferred to be invoked over the IP domain.

41. The apparatus of claim 33, wherein the means for identifying the domain are integrated with the access terminal.

42. The apparatus of claim 33, wherein the access terminal does not have a current communication attachment with a network when the domain for delivering the message service information is identified.

43. The apparatus of claim 33, wherein the means for determining whether the message service information can be delivered over NAS signaling comprises means for attempting a combined Tracking Area Update (TAU) for Short Message Service (SMS) in response to determining that the access terminal has a current communication attachment with an Evolved-UMTS Terrestrial RAN and that an IMSI attach procedure was not previously attempted.

44. A non-transitory computer-readable medium comprising code for causing an access terminal to:
   determine that message service information is to be sent by the access terminal subsequent to the access terminal storing an indication that indicates whether a message service originated by the access terminal is preferred to be invoked over an Internet Protocol (IP) domain or that the message service is not to be invoked over the IP domain;
   identify a domain for delivering the message service information based on the indication stored at the access terminal, wherein the domain for delivering the message service information is identified when the access terminal originates the message service, wherein identifying the domain comprises:
      determining whether the message service information can be delivered over non-access stratum (NAS) signaling in response to the stored indication indicating that the message service is not to be invoked over the IP domain, wherein determining whether the message service information can be delivered over NAS signaling comprises:
         attempting a combined Evolved Packet System (EPS) and International Mobile Subscriber Identity (IMSI) attach procedure; and
         determining the message service information can be delivered over NAS signaling if the combined EPS and IMSI attach is successful; and
   send the message service information over the identified domain.

45. The non-transitory computer-readable medium of claim 44, wherein the message service comprises Short Message Service (SMS).

46. The non-transitory computer-readable medium of claim 45, wherein the IP domain comprises an IMS domain.

47. The non-transitory computer-readable medium of claim 44, wherein the code for causing the access terminal to identify the domain comprises code for causing the access terminal to determine whether the message service information can be delivered over IMS signaling in response to the indication stored at the access terminal indicating that the message service is preferred to be invoked over the IP domain.

48. The non-transitory computer-readable medium of claim 47, wherein, if it is determined that the message service information cannot be delivered over IMS signaling, the code for causing the access terminal to identify the domain comprises code for causing the access terminal to determine whether the message service information can be delivered over NAS signaling in response to determining that the message service information cannot be delivered over IMS signaling.

49. The non-transitory computer-readable medium of claim 48, wherein the code for causing the access terminal to determine whether the message service information can be delivered over NAS signaling comprises code for causing the access terminal to attempt a combined Tracking Area Update (TAU) for Short Message Service (SMS) in response to determining that the access terminal has a current communication attachment with an Evolved-UMTS Terrestrial RAN and that an IMSI attach procedure was not previously attempted.

50. The non-transitory computer-readable medium of claim 47, wherein, if it is determined that the message service information cannot be delivered over IMS signaling, the code for causing the access terminal to identify the domain comprises code for causing the access terminal to attempt a CDMA 1x registration to deliver the message service information over an S102 interface in response to determining that the message service information cannot be delivered over IMS signaling.

51. The non-transitory computer-readable medium of claim 44, wherein the code for causing the access terminal to identify the domain comprises code for causing the access terminal to determine whether the message service information can be delivered over IMS signaling based on whether IMSI attach procedure has previously succeeded in response to the stored indication indicating that the message service is preferred to be invoked over the IP domain.

52. The non-transitory computer-readable medium of claim 44, wherein the non-transitory computer-readable medium is integrated with the access terminal.

53. The non-transitory computer-readable medium of claim 44, wherein the access terminal does not have a current communication attachment with a network when the domain for delivering the message service information is identified.

54. The non-transitory computer-readable medium of claim 44, wherein the code for causing the access terminal to determine whether the message service information can be delivered over NAS signaling comprises code for causing the access terminal to attempt a combined Tracking Area Update (TAU) for Short Message Service (SMS) in response to determining that the access terminal has a current communication attachment with an Evolved-UMTS Terrestrial RAN and that an IMSI attach procedure was not previously attempted.

* * * * *